United States Patent
Mitsuki

(10) Patent No.: US 7,288,916 B2
(45) Date of Patent: Oct. 30, 2007

(54) PULSE WIDTH MODULATION SIGNAL GENERATING APPARATUS HAVING TWO DEAD TIMES FOR ON-TIMINGS

(75) Inventor: Junko Mitsuki, Kanagawa (JP)

(73) Assignee: NEC Electronics Corporation, Kawasaki-Shi, Kanagawa (JP)

( * ) Notice: Subject to any disclaimer, the term of this patent is extended or adjusted under 35 U.S.C. 154(b) by 860 days.

(21) Appl. No.: 10/732,348

(22) Filed: Dec. 11, 2003

(65) Prior Publication Data

US 2005/0025231 A1  Feb. 3, 2005

(30) Foreign Application Priority Data

Dec. 25, 2002  (JP)  ............... 2002-375605

(51) Int. Cl.
 *H02P 27/08* (2006.01)
(52) U.S. Cl. ..................... 318/723; 318/811
(58) Field of Classification Search ............. 318/723, 318/811; 327/172–177; 332/109–111; 375/238
 See application file for complete search history.

(56) References Cited

U.S. PATENT DOCUMENTS

| 5,506,484 A | 4/1996 | Munro et al. |
| 6,396,250 B1 | 5/2002 | Bridge |
| 7,057,910 B2 * | 6/2006 | Takahashi et al. .......... 363/141 |
| 2002/0184469 A1 | 12/2002 | Bowling |

FOREIGN PATENT DOCUMENTS

| JP | 9-163759 | 6/1997 |
| JP | 10-112982 | 4/1998 |
| JP | 11-75375 | 3/1999 |
| JP | 2001-157457 | 6/2001 |
| JP | 2002-335679 | 11/2002 |

* cited by examiner

*Primary Examiner*—David Mis
(74) *Attorney, Agent, or Firm*—McGinn IP Law Group, PLLC

(57) ABSTRACT

In an apparatus for generating complementary first and second pulse width modulation signals, a signal generating circuit generates a first signal for causing the first pulse width signal to switch from an ON level to an OFF level, a second signal for causing the first pulse width signal to switch from the OFF level to the ON level, a third signal for causing the second pulse width signal to switch from the ON level to the OFF level, and a fourth signal for causing the second pulse width signal to switch from the OFF level to the ON level. A control circuit sets a first dead time between the first and fourth signals and a second time between the third and second signals individually.

12 Claims, 19 Drawing Sheets

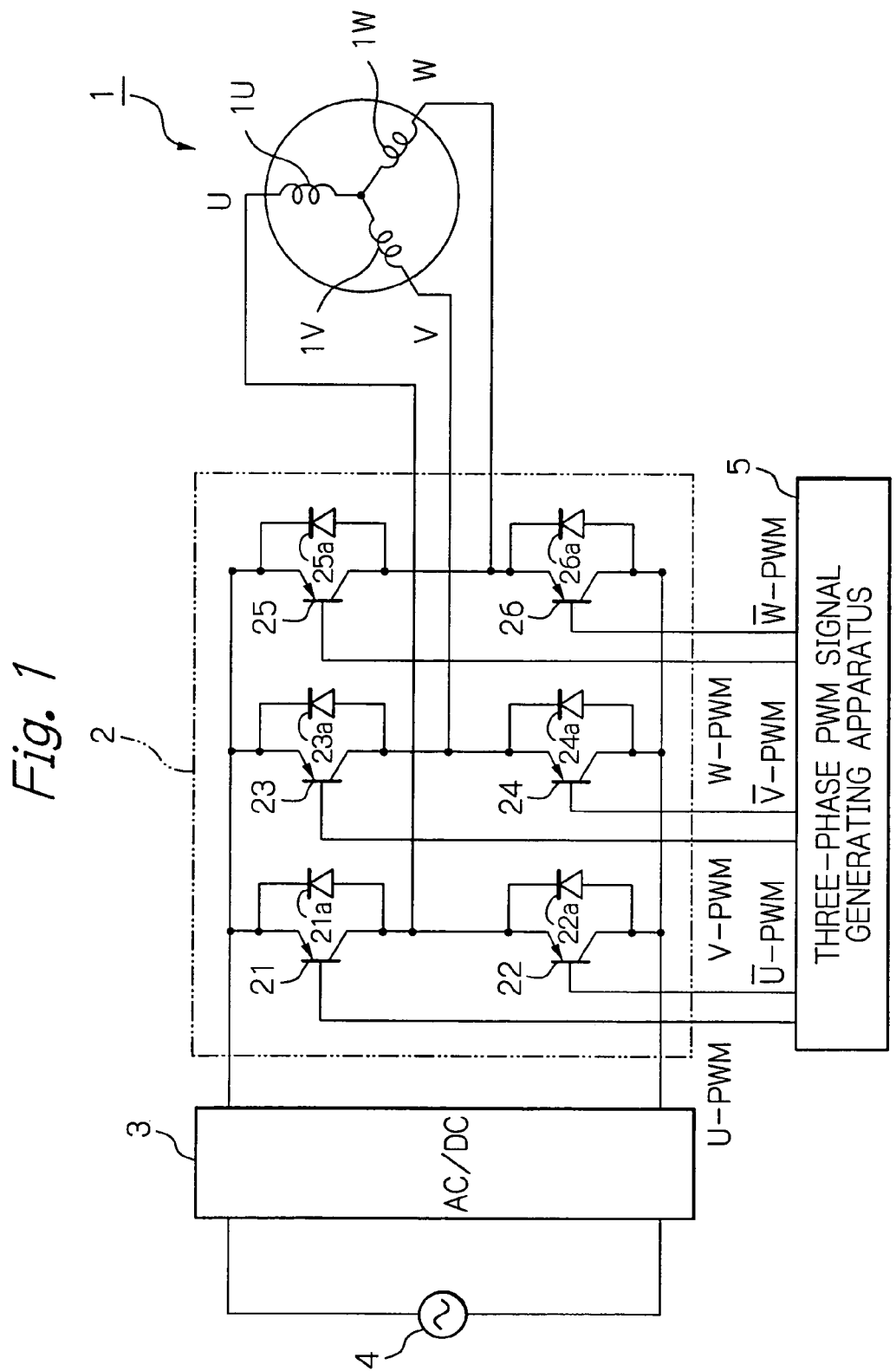

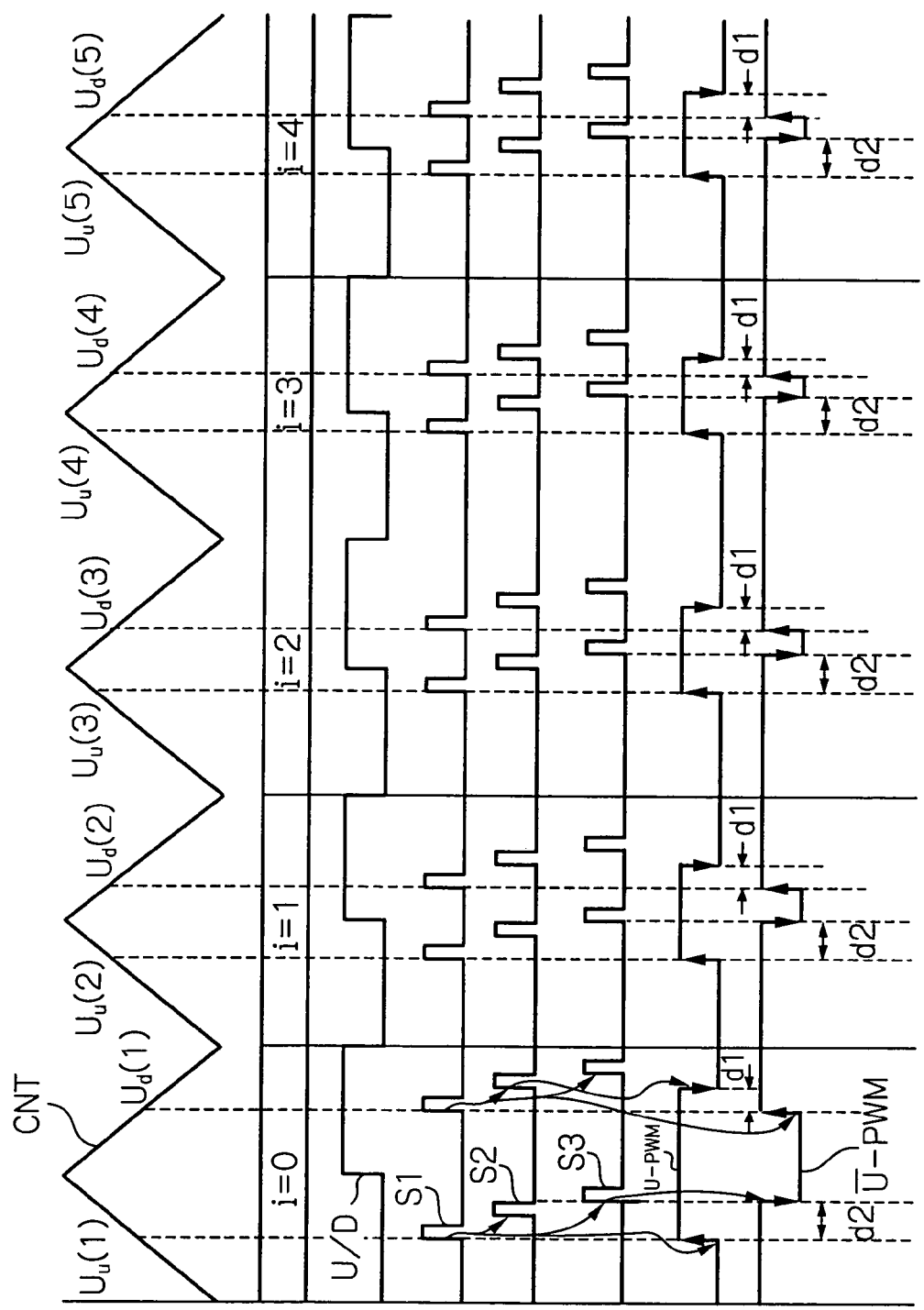

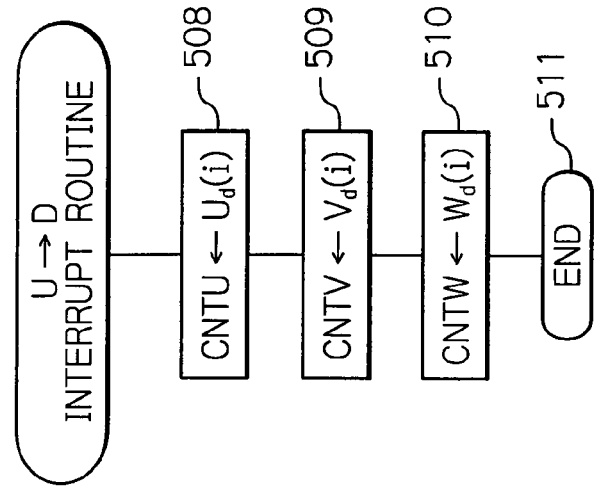
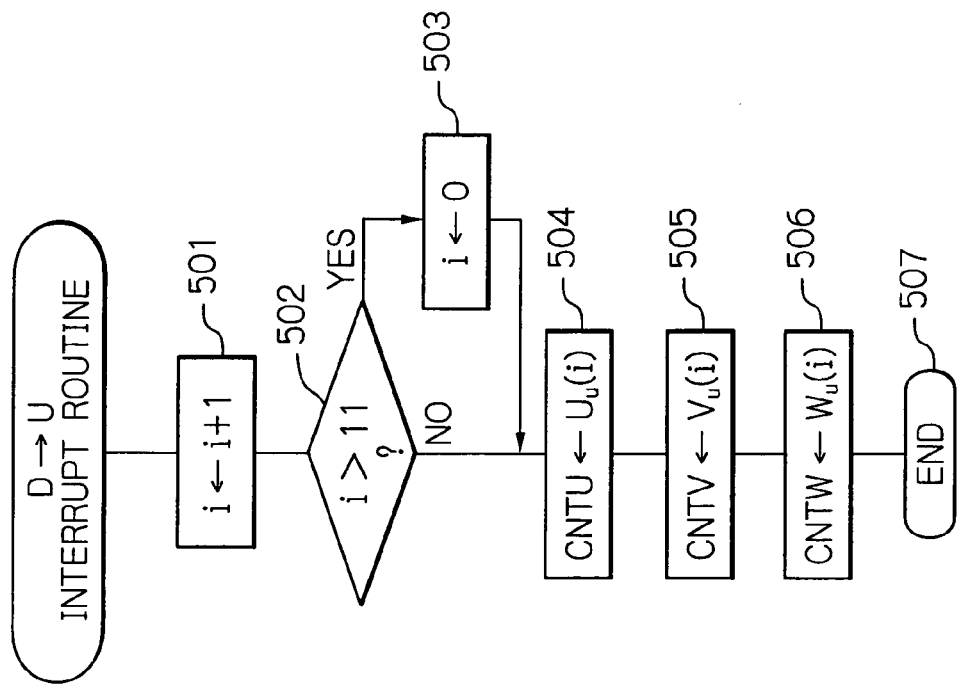

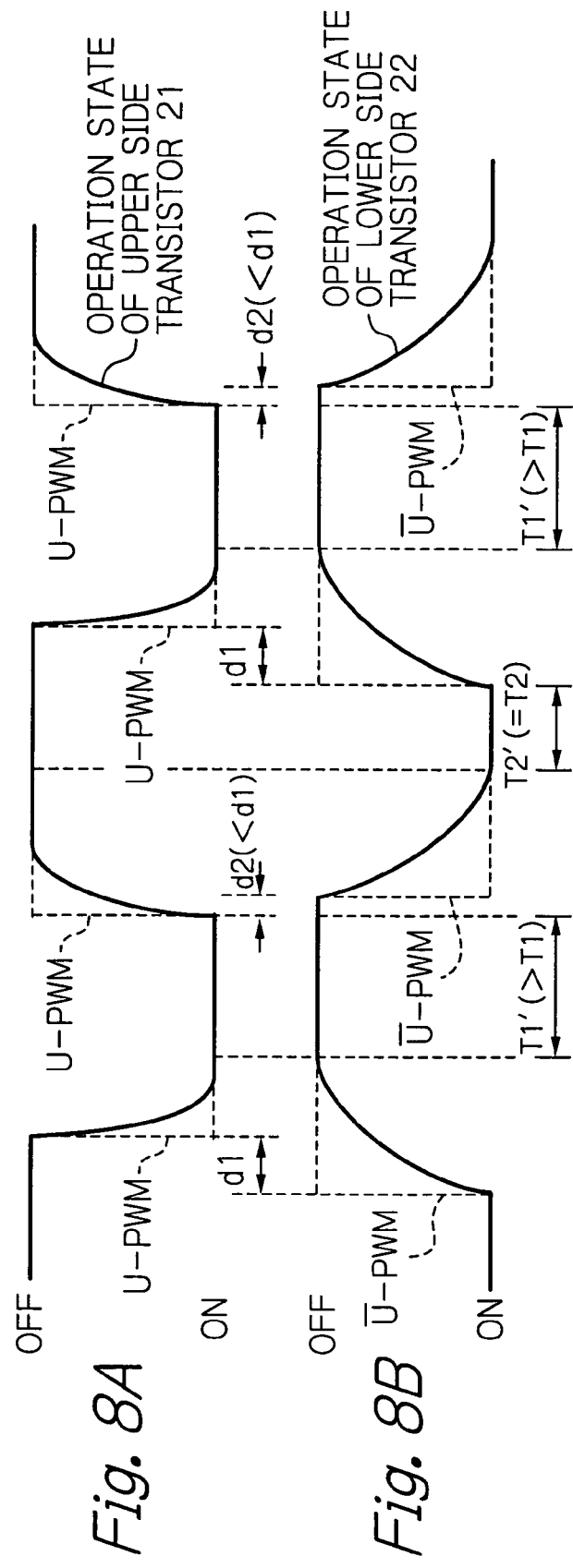

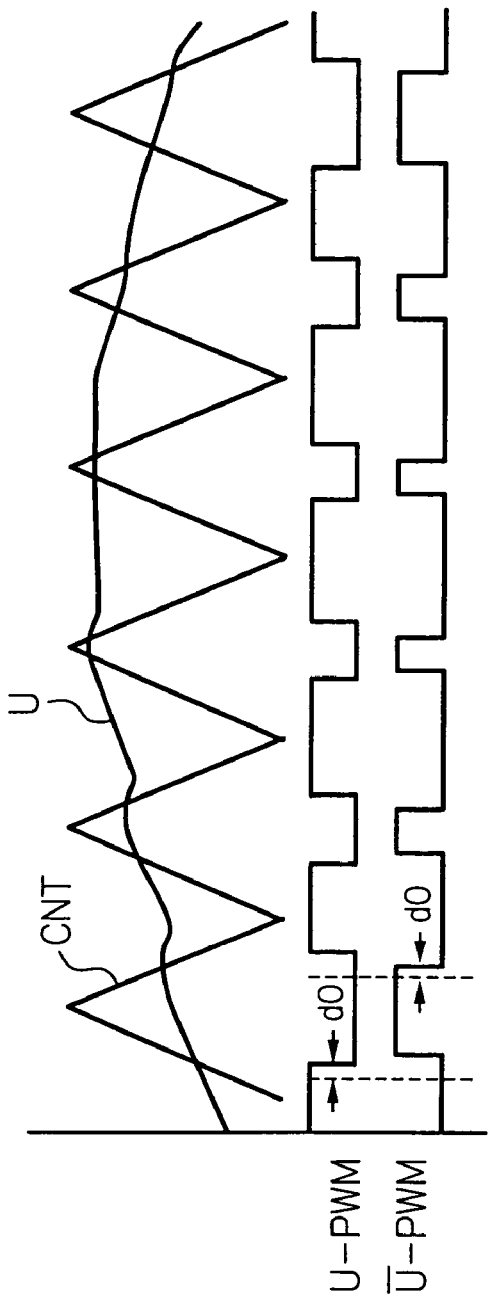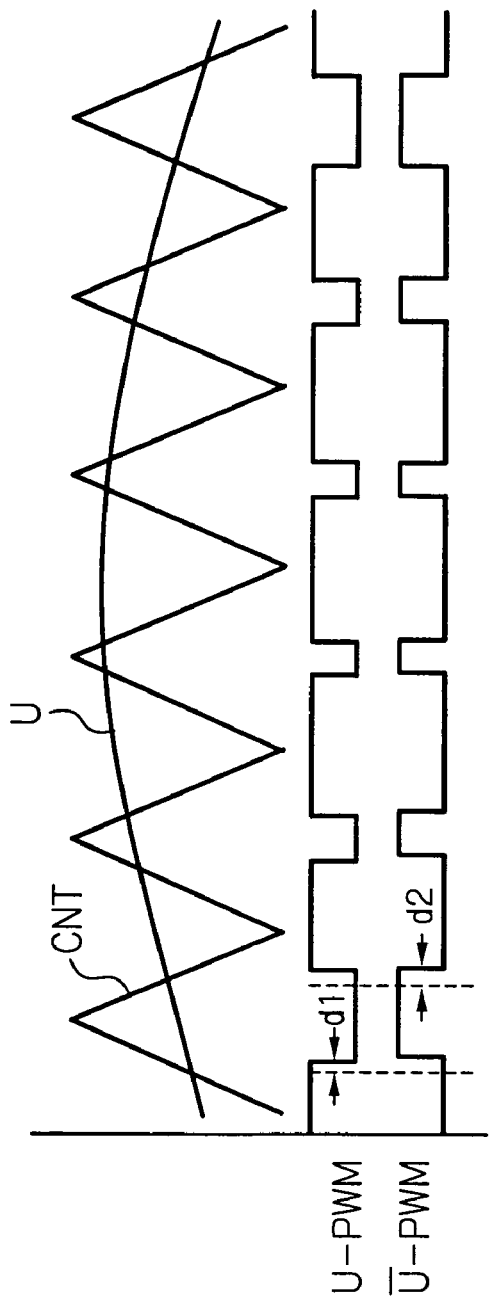

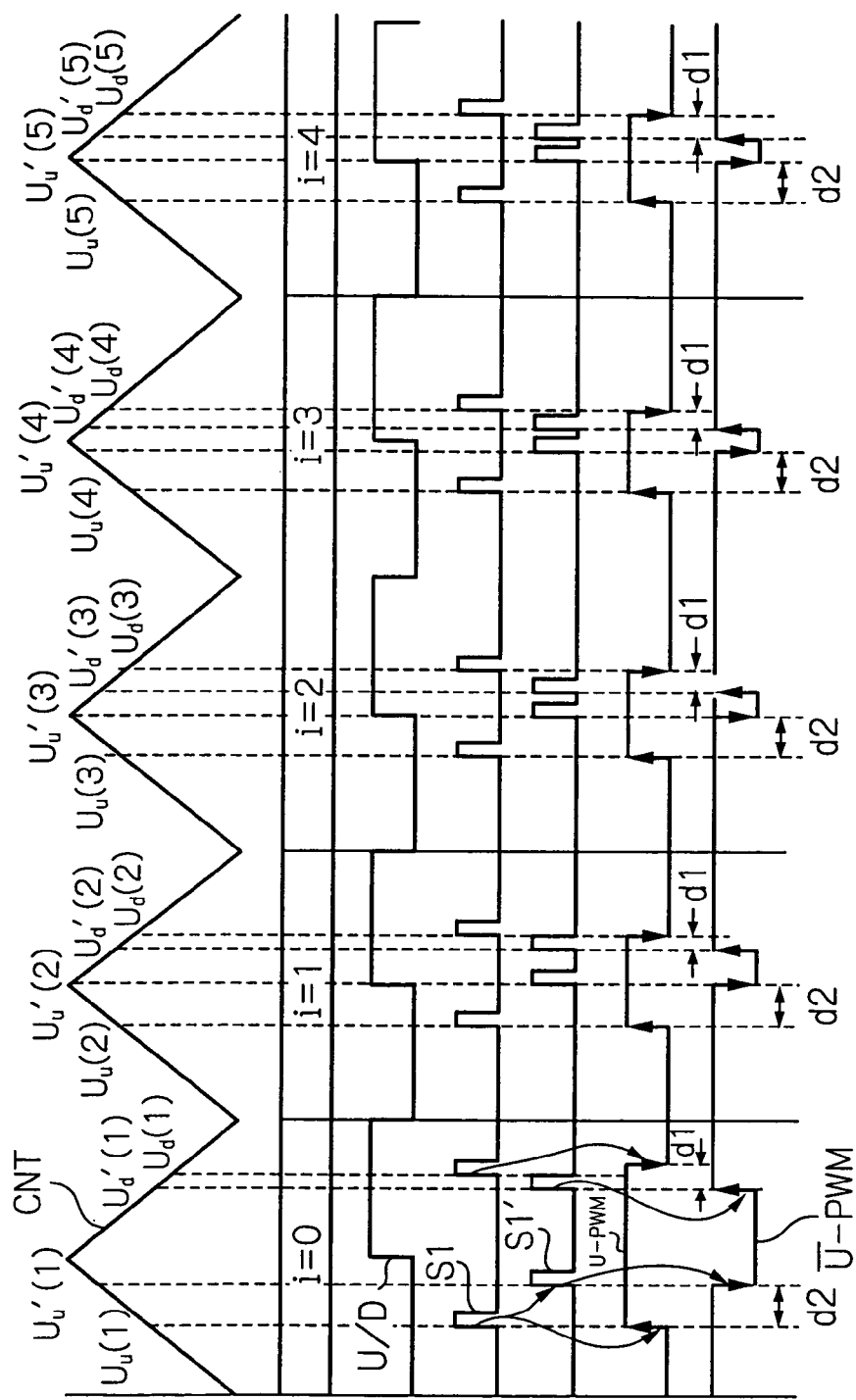

PULSE WIDTH MODULATION SIGNAL GENERATING APPARATUS HAVING TWO DEAD TIMES FOR ON-TIMINGS

BACKGROUND OF THE INVENTION

1. Field of the Invention

The present invention relates to a pulse width modulation (PWM) signal generating apparatus for generating PWM signals for controlling a PWM inverter for driving a motor.

2. Description of the Related Art

Generally, in a PWM inverter for driving a motor, a PWM signal generating apparatus generates PWM signals for controlling the PWM inverter.

For example, a three-phase PWM inverter is constructed by three arms, i.e., a U-phase arm, a V-phase arm and a W-phase arm, each of the arms including an upper side power transistor and a lower side power transistor connected in series between two DC power lines.

On the other hand, a three-phase PWM signal generating apparatus generates complementary U-phase and /U-phase PWM signals, complementary V-phase and /V-phase PWM signals, and complementary W-phase and /W-phase PWM signals. As a result, the power transistors of the U-phase arm carry out a complementary push-pull operation using the U-phase and /U-phase signals. Also, the power transistors of the V-phase arm carry out a complementary push-pull operation using the V-phase and /V-phase signals. Further, the power transistors of the W-phase arm carry out a complementary push-pull operation using the W-phase and /W-phase signals.

In each of the U-phase arm, the V-phase arm and the W-phase arm, if the two power transistors are simultaneously turned ON, a short-circuit current may flow therethrough.

In a prior art three-phase PWM signal generating apparatus, in order to avoid the above-mentioned short-circuit current, a common dead time is introduced to delay the ON-timing of each of the U-phase PWM signal, the /U-phase PWM signal, the V-phase PWM signal, the /V-phase PWM signal, the W-phase PWM signal and the /W-phase PWM signal, so that the ON-timing of each of the power transistors of the three-phase PWM inverter is delayed (see: JP-A-10-112982).

In the above-described prior art three-phase PWM signal generating apparatus, however, generally, since the upper side power transistors have a different driving ability from that of the lower side power transistors, i.e., since the upper side power transistors have different ON/OFF switching times from those of the lower side power transistors, an optimum complementary push-pull operation time period, where one of the upper side power transistors is completely turned ON and a corresponding one of the lower side power transistors is completely turned OFF and vice versa, is decreased. As a result, the total torque of the motor would be decreased to increase the power consumption.

SUMMARY OF THE INVENTION

It is an object of the present invention to provide a PWM signal generating apparatus generating a PWM signal capable of increasing an optimum complementary push-pull operation time period of a PWM inverter.

According to the present invention, a first dead time is introduced into the ON timing of one of the two complementary PWM signals, and a second dead time is introduced into the ON timing of the other. The first and second dead times are individually set. Therefore, the first dead time is optimum for controlling an upper side power transistor of a PWM inverter, and the second dead time is optimum for controlling a lower side power transistor of the PWM inverter.

BRIEF DESCRIPTION OF THE DRAWINGS

The present invention will be more clearly understood from the description set forth below, with reference to the accompanying drawings, wherein:

FIG. 1 is a circuit diagram illustrating an apparatus for driving an AC motor including a first embodiment of the three-phase PWM signal generating apparatus according to the present invention;

FIGS. 4A through 4G are timing diagrams showing the signals of the apparatus of FIG. 3;

FIGS. 5A and 5B are flowcharts for explaining setting methods of the reference values of the compare registers of FIG. 3;

FIGS. 8A and 8B are timing diagrams showing a relationship between the three-phase PWM signals and the inverter output voltages of FIG. 3, introducing two different dead times;

FIG. 9A is a timing diagram showing one of the inverter output voltages in the prior art;

FIG. 9B is a timing diagram showing one of the inverter output voltages according to the present invention;

FIGS. 15A through 15F are timing diagrams showing the signals of the apparatus of FIG. 14;

DESCRIPTION OF THE PREFERRED EMBODIMENTS

Figures 2A, 2B, 2C, 2D:
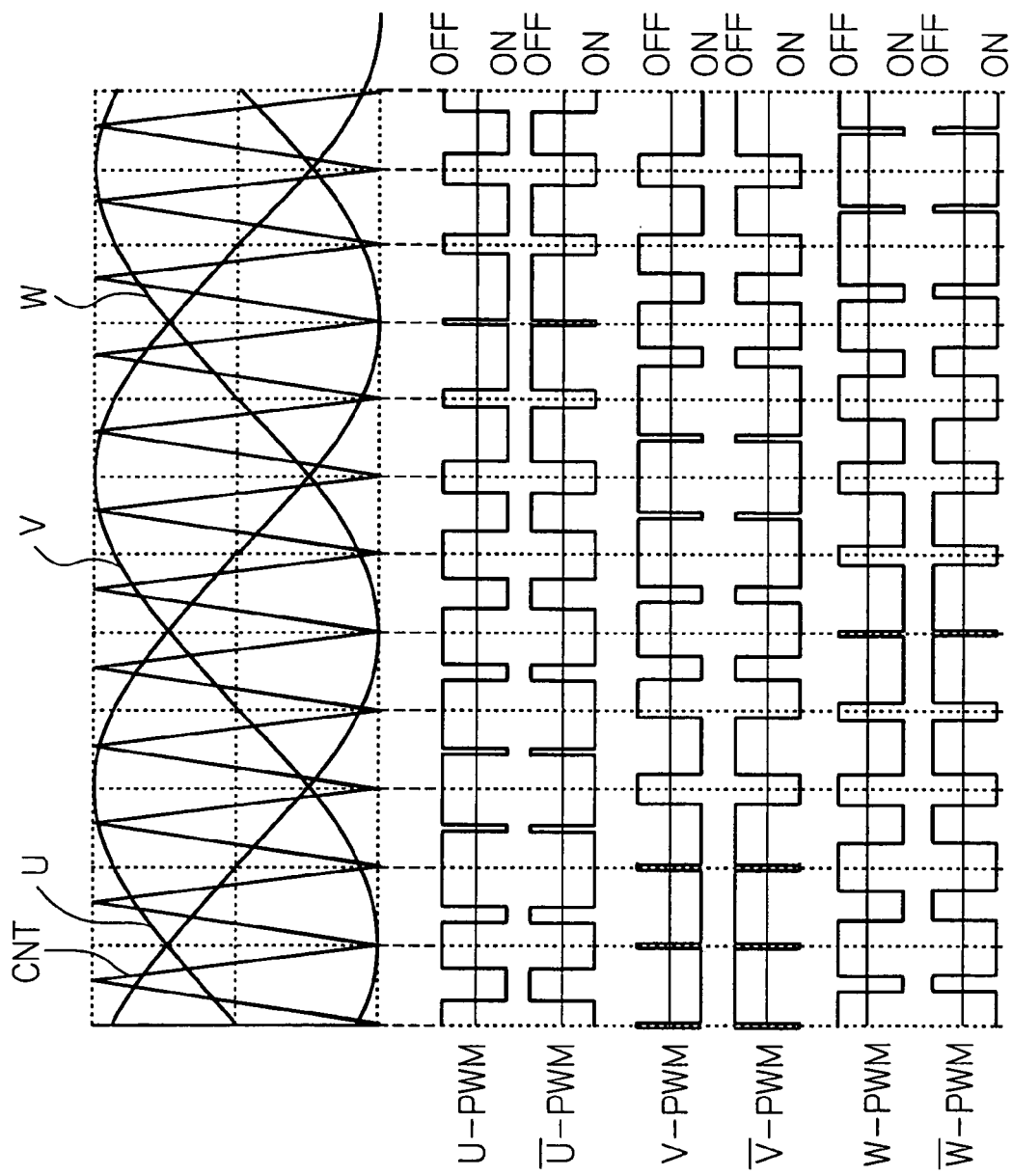
FIGS. 2A, 2B, 2C and 2D are timing diagrams showing the signals of the apparatus of FIG. 1.

FIG. 1 is a circuit diagram illustrating an apparatus for driving an AC motor including a first embodiment of the three-phase PWM signal generating apparatus according to the present invention.

In FIG. 1, reference numeral 1 designates a stator of the AC motor having a U-phase winding 1U, a V-phase winding 1V and a W-phase winding 1W. The stator 1 is associated with a rotor (not shown).

A three-phase PWM inverter 2 receives a DC voltage from an AC/DC converter 3 powered by an AC power supply source 4, and inverts the DC voltage into three-phase AC voltages U, V and W as shown in FIG. 2A which are applied to the windings 1U, 1V and 1W of the stator 1.

The three-phase PWM inverter 2 is a serial-parallel bridge circuit having a U-phase arm, a V-phase arm and W-phase arm. The U-phase arm for generating the AC voltage U is constructed by a series of an upper side PNP-type bipolar power transistor 21 and a lower side PNP-type bipolar power transistor 22 associated with counterelectromotive force regenerative diodes 21a and 22a connected in parallel thereto. Also, the V-phase arm for generating the AC voltage V is constructed by a series of an upper side PNP-type bipolar power transistor 23 and a lower side PNP-type bipolar power transistor 24 associated with counterelectromotive force regenerative diodes 23a and 24a connected in parallel thereto. Further, the W-phase arm for generating the AC voltage W is constructed by a series of an upper side PNP-type bipolar power transistor 25 and a lower side PNP-type bipolar power transistor 26 associated with counterelectromotive force regenerative diodes 25a and 26a connected in parallel thereto.

The three-phase PWM inverter 2 is controlled by a three-phase PWM signal generating apparatus 5 according to the present invention which generates complementary U-phase and /U-phase PWM signals as shown in FIG. 2B, complementary V-phase and /V-phase PWM signals as shown in FIG. 2C, and complementary W-phase and /W-phase PWM signals as shown in FIG. 2D. As a result, the power transistors 21 and 22 carry out a push-pull operation using the U- and /U-phase PWM signals. Also, the power transistors 23 and 24 carry out a push-pull operation using the V- and /V-phase PWM signals. Further, the power transistors 25 and 26 carry out a push-pull operation using the W- and /W-phase PWM signals. Thus, the stator 1 is driven by the three-phase AC voltages U, V and W.

In FIG. 2A, a value CNT of a triangular carrier signal is generated within the three-phase PWM signal generating apparatus 5 of FIG. 1 in order to generate the U- and /U-phase PWM signals, the V- and /V-phase PWM signals and the W- and /W-phase PWM signals.

In each of the arms of the three-phase inverter 2, if the upper side power transistor such as 21 and the lower side power transistor such as 22 are simultaneously turned ON, a short-circuit current may flow therethrough. In order to avoid such a short-circuit current, the ON time period of the U-phase PWM signal is never superposed onto the ON time period of the /U-phase PWM signal, the ON time period of the V-phase PWM signal is never superposed onto the ON time period of the /V-phase PWM signal, and the ON time period of the W-phase PWM signal is never superposed onto the ON time period of the /W-phase PWM signal. In more detail, a dead time d0 is introduced into the ON timings of the U-phase PWM signal, the V-phase PWM signal, and the W-phase PWM signal, and a dead time d1 is introduced into the ON timings of the /U-phase PWM signal, the /V-phase PWM signal, and the /W-phase PWM signal. This will be explained in detail below.

Figure 3:
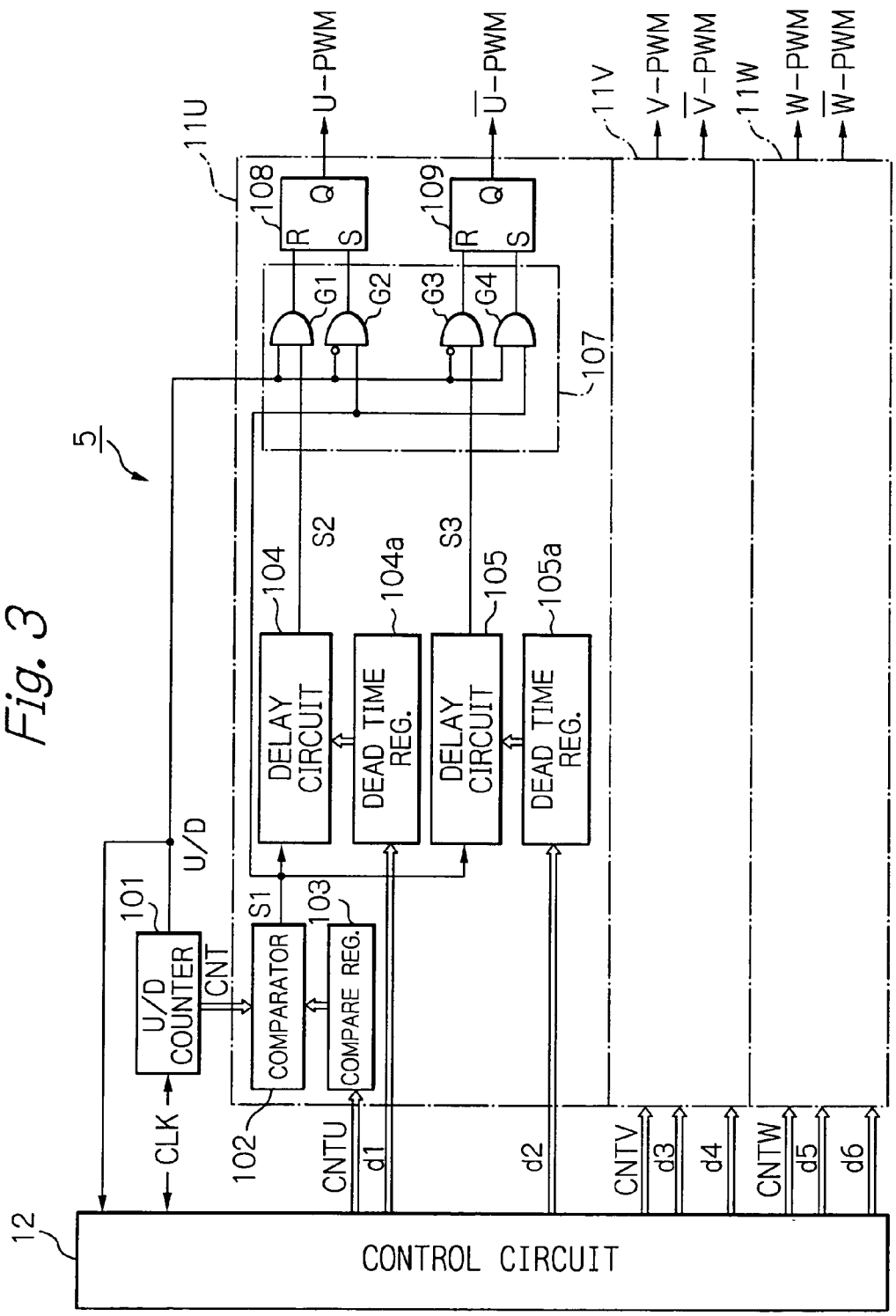
FIG. 3 is a detailed block circuit diagram of the three-phase PWM signal generating apparatus of FIG. 1.

In FIG. 3, which is a detailed block circuit diagram of the three-phase PWM signal generating apparatus 5 of FIG. 1, a U-phase PWM signal generating section 11U, a V-phase PWM signal generating section 11V and a W-phase PWM signal generating section 11W which have the same configuration are provided, and a control circuit 12 for controlling the entire of the apparatus of FIG. 3 are provided. The control circuit 12 may be constructed by a microcomputer.

Also, an up/down counter 101 receives a clock signal CLK to generate a value CNT of a triangular carrier signal as shown in FIG. 4A, and a count direction signal U/D as shown in FIG. 4B. In this case, the period of the triangular carrier signal is one twelfth of the period of the three-phase AC voltages U, V and W.

The triangular carrier signal and the counting direction signal U/D are supplied to the U-phase PWM signal generating section 11U, the V-phase PWM signal generating section 11V and the W-phase PWM signal generating section 11W. Also, the counting direction signal U/D is supplied as an interrupt signal to the control circuit 12.

The U-phase PWM signal generating section 11U of FIG. 3 is explained in detail below.

A comparator 102 compares the value CNT of the triangular carrier signal with a reference value CNTU stored in a compare register 103. As a result, when the value CNT of the triangular carrier signal coincides with the reference value CNTU of the compare register 103, the comparator 102 generates a coincidence signal S1 as shown in FIG. 4C.

The coincidence signal S1 is supplied as set signals to delay circuits 104 and 105 which are constructed by down counters. Therefore, dead times d1 and d2 stored in dead time registers 104a and 105a, respectively, are set in the delay circuits 104 and 105, respectively, so that the delay circuits 104 and 105 serving as the down counters are counted down. As a result, when the dead time d1 has passed, the delay circuit 104 generates a delayed coincidence signal S2 as shown in FIG. 4D. Similarly, when the dead time d2 has passed, the delay circuit 105 generates a delayed coincidence signal S3 as shown in FIG. 4E.

The coincidence signal S1 and the delayed coincidence signals S2 and S3 are supplied to a selection circuit 107 formed by four gate circuits G1, G2, G3 and G4 controlled by the counting direction signal U/D to operate RS-type flip-flops 108 and 109.

For example, when the counting direction signal U/D is "1" (down count state), the gate circuits G1 and G4 are activated by the counting direction signal U/D. Therefore, the delayed coincidence signal S2 passes through the gate circuit G1 to reset the RS-type flip-flop 108, so that the U-phase PWM signal is made "0" (ON level) as shown in FIG. 4F. Also, the coincidence signal S3 passes through the gate circuit G4 to set the RS-type flip-flop 109, so that the /U-phase PWM signal is made "1" (OFF level) as shown in FIG. 4G.

On the other hand, when the counting direction signal U/D is "0" (up count state), the gate circuits G2 and G3 are activated by the counting direction signal U/D. Therefore, the coincidence signal S1 passes through the gate circuit G2 to set the RS-type flip-flop 108, so that the U-phase PWM signal is made "1" (OFF level) as shown in FIG. 4F. Also, the delayed coincidence signal S3 passes through the gate circuit G3 to set the RS-type flip-flop 109, so that the /U-phase PWM signal is made "0" (ON level) as shown in FIG. 4G.

Thus, the ON timing of the U-phase PWM signal is delayed by the dead time d1, and the ON timing of the /U-phase PWM signal is delayed by the dead time d2.

In FIG. 3, the dead times d1 and d2 of the dead time registers 104a and 105a for the U-phase PWM signal generating section 11U as well as the dead times d3 and d4 for the V-phase PWM signal generating section 11V and the dead times d5 and d6 for the W-phase PWM signal generating section 11W are set by the control circuit 12 in advance.

Also, the reference value CNTU of the compare register 103 as well as the reference value CNTV of the compare registers (not shown) for the V-phase PWM signal generating section 11V and the reference value CNTW of the compare registers (not shown) for the W-phase PWM signal generating section 11W are set by interrupt routines as illustrated in FIGS. 5A and 5B.

The interrupt routine of FIG. 5A is started every time the counting direction signal U/D is switched from "1" (down counting state) to "0" (up counting state).

First, at step 501, a value i is counted up by +1.

Next, at step 502, it is determined whether or not i>11 is satisfied. Here, assume that the U-phase PWM signal, the V-phase PWM signal and the W-phase PWM signal have a period of 12 PWM pulses. Only when i>11, does the control proceed to step 503 which clears the value i, i.e., i←0. Otherwise, the control proceeds directly to step 504.

At step 504,

CNTU←$U_u(i)$

Then, the reference value CNTU is set in the compare register 103.

Next, at step 505,

CNTV←$V_u(i)$

Then, the reference value CNTV is set in the compare register of the V-phase PWM signal generating section 11V.

Next, at step 506,

CNTW←$W_u(i)$

Then, the reference value CNTW is set in the compare register of the W-phase PWM signal generating section 41W.

Thus, the flowchart of FIG. 5A is completed by step 507.

Note that the reference values $U_u(0)$, $U_u(1)$, ..., $U_u(11)$; $V_u(0)$, $V_u(1)$, ..., $V_u(11)$; and $W_u(0)$, $W_u(1)$, ..., $W_u(11)$ are predetermined in accordance with the abilities of the power transistors 21, 22, 23, 24, 25 and 26, and are stored in a read-only memory (ROM) of the control circuit 12.

The interrupt routine of FIG. 5B is started every time the counting direction signal U/D is switched from "0" (up counting state) to "1" (down counting state).

First, at step 508,

CNTU←$U_d(i)$

Then, the reference value CNTU is set in the compare register 103.

Next, at step 509,

CNTV←$V_d(i)$

Then, the reference value CNTV is set in the compare register of the V-phase PWM signal generating section 11V.

Next, at step 510,

CNTW←$W_d(i)$

Then, the reference value CNTW is set in the compare register of the W-phase PWM signal generating section 11W.

Thus, the flowchart of FIG. 5B is completed by step 511.

Note that the reference values $U_d(0)$, $U_d(1)$, ..., $U_d(11)$; $V_d(0)$, $V_d(1)$, ..., $V_d(11)$; and $W_d(0)$, $W_d(1)$, ..., $W_d(11)$ are also predetermined in accordance with the abilities of the power transistors 21, 22, 23, 24, 25 and 26, and are stored in the ROM of the control circuit 12.

Figures 6A, 6B:
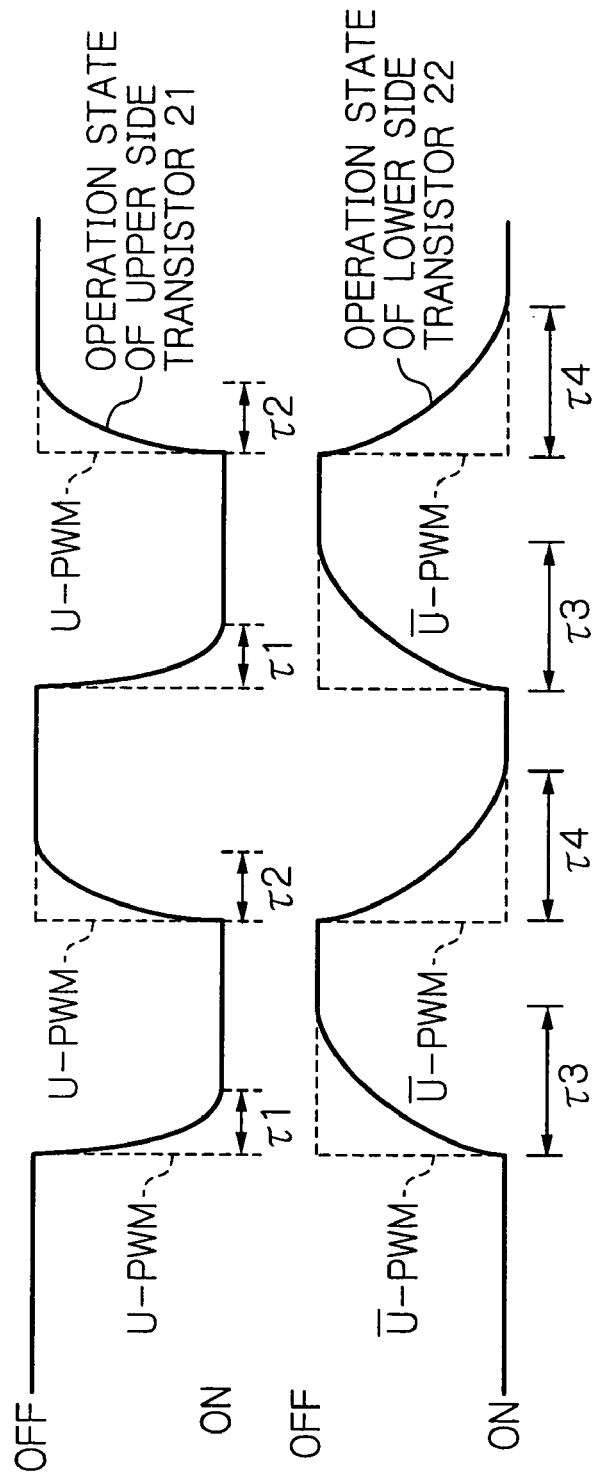
FIGS. 6A and 6B are timing diagrams showing a relationship between the three-phase PWM signals and the inverter output voltages of FIG. 3, without introducing dead times.

According to the first embodiment, as illustrated in FIGS. 1 and 3, since the dead times d1 and d2 are individually set, an optimum complementary push-pull operation time is increased. That is, if the driving ability of the upper side power transistor 21 is larger than that of the lower side power transistor 22, the ON/OFF operation state of the upper side power transistor 21 is changed in accordance with the U-phase PWM signal as shown in FIG. 6A, and the ON/OFF operation state of the lower side power transistor 22 is changed in accordance with the /U-phase PWM signal as shown in FIG. 6B. For example, an ON switching time τ1 of the upper side power transistor 21 is smaller than an ON switching time τ3 of the lower side power transistor 22. Similarly, an OFF switching time τ2 of the upper side power transistor 21 is smaller than an OFF switching time τ4 of the lower side power transistor 22.

Figures 7A, 7B:
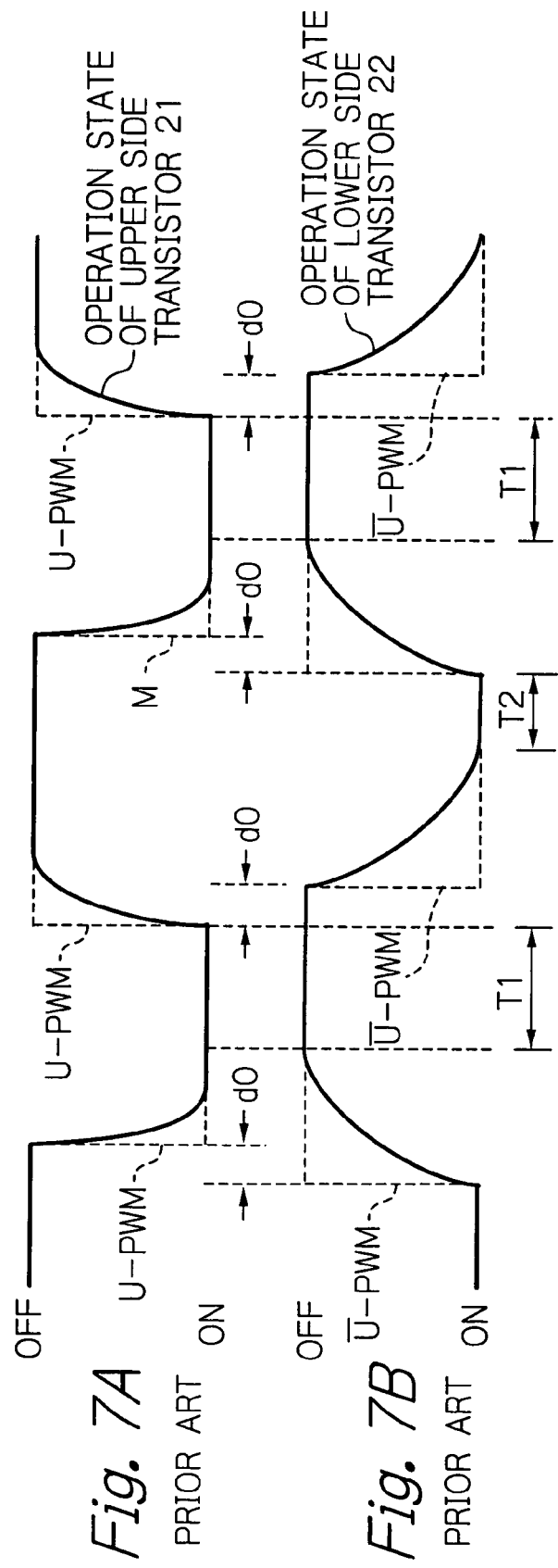
FIGS. 7A and 7B are timing diagrams showing a relationship between the three-phase PWM signals and the inverter output voltages of FIG. 3, introducing a common dead time.

In the prior art, a common dead time d0 is introduced into the ON timing of the upper side power transistor 21 and the ON timing of the lower side power transistor 22 as shown in FIGS. 7A and 7B. Therefore, an optimum push-pull operation time period T is represented by $$T=T1+T2$$

where T1 is a time period where the power transistor 21 is completely turned ON and the power transistor 22 is completely turned OFF; and T2 is a time period where the power transistor 21 is completely turned OFF and the power transistor 22 is completely turned ON.

On the other hand, in the present invention, a dead time d1 is introduced into the ON timing of the upper side power transistor 21, and a dead time d2 (<d1) is introduced into the ON timing of the lower side power transistor 22 as shown in FIGS. 8A and 8B. Therefore, an optimum push-pull operation time period T' is represented by $$T'=T1'+T2'$$

where T1' is a time period where the power transistor 21 is completely turned ON and the power transistor 22 is completely turned OFF; and T2' is a time period where the power transistor 21 is completely turned OFF and the power transistor 22 is completely turned ON. In this case, T1'>T1 and T2'=T2. Therefore, T'>T.

Thus, the optimum complementary push-pull operation time can be increased, which would increase the total torque of the motor, thus decreasing the power consumption.

Generally, note that the motor can be rotated by its inertia during a dead time. Therefore, the smaller the dead time, the smoother the inverter output voltage. That is, if the dead time d0 is relatively large as in the prior art, the inverter output voltage such as the U-phase voltage is not smooth as shown in FIG. 9A. On the other hand, in FIGS. 8A and 8B, although d2>d0>d1, if the dead time d2 is brought close to d0 to sacrifice the optimum complementary push-pull operation time period, the average dead time is relatively small, so that the inverter output voltage such as the U-phase voltage is smooth as shown in FIG. 9B.

Figure 10:
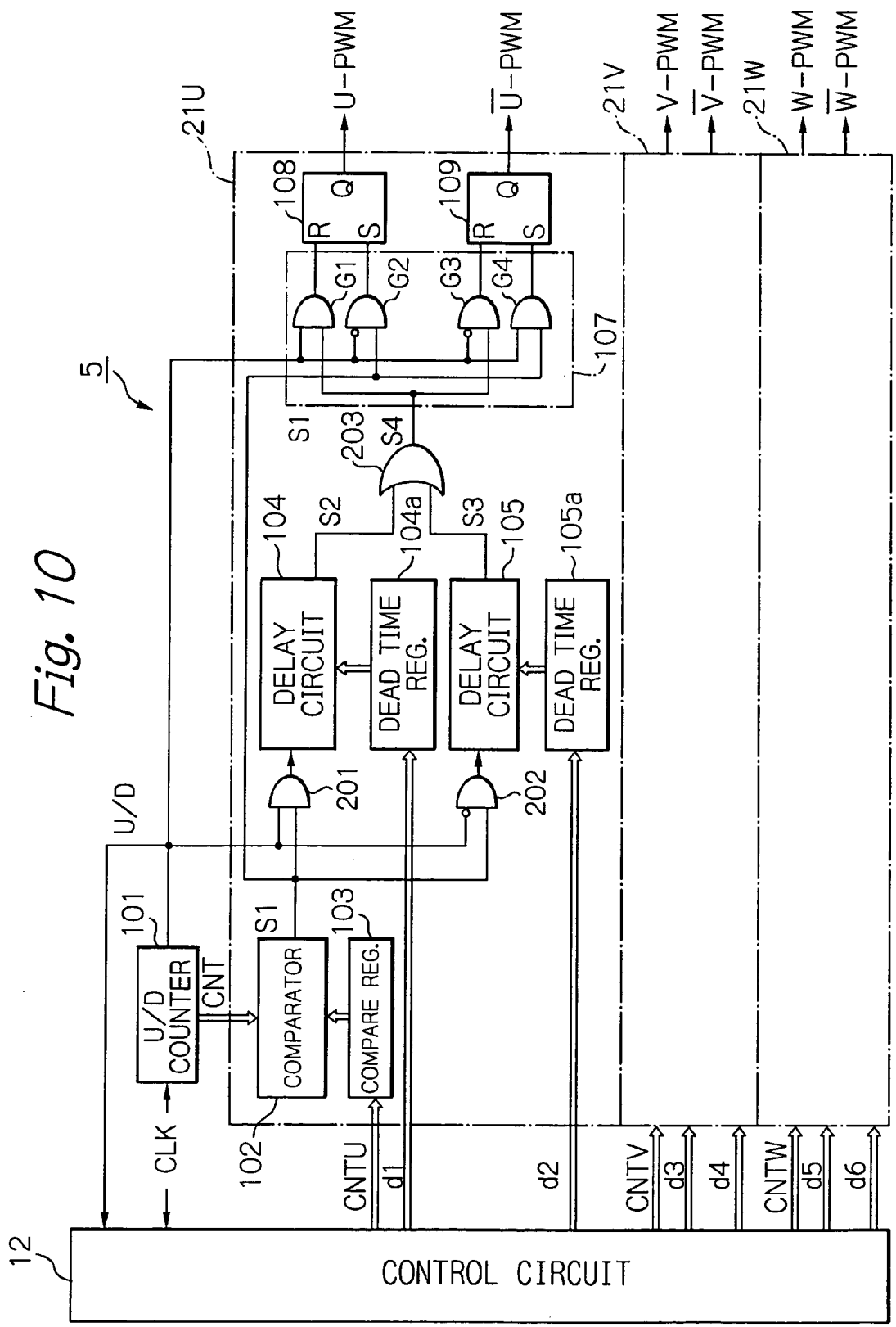
FIG. 10 is a circuit diagram illustrating a second embodiment of the three-phase PWM signal generating apparatus according to the present invention.

In FIG. 10, which illustrates a second embodiment of the three-phase PWM signal generating apparatus according to the present invention, the U-phase PWM signal generating section 11U, the V-phase PWM signal generating section 11V and the W-phase PWM signal generating section 11W of FIG. 3 are replaced by a U-phase PWM signal generating section 21U, a V-phase PWM signal generating section 21V and a W-phase PWM signal generating section 21W, respectively.

In the U-phase PWM signal generating section 21U, gate circuits 201 and 202 and an OR circuit 203 are added to the elements of the U-phase PWM signal generating circuit 11U of FIG. 3. That is, the gate circuit 201 controlled by the counting direction signal U/D is connected between the comparator 102 and the delay circuit 104, and the gate circuit 202 controlled by the counting direction signal U/D is connected between the comparator 102 and the delay circuit 105.

Also, the delayed coincidence signals S2 and S3 are combined by the OR circuit 203 to generate a delayed coincidence signal S4.

Similarly, gate circuits and an OR circuit corresponding to the gate circuits 201 and 202 and the OR circuit 203 are provided in the V-phase PWM signal generating section 21V and the W-phase PWM signal generating section 21W.

Figure 11:
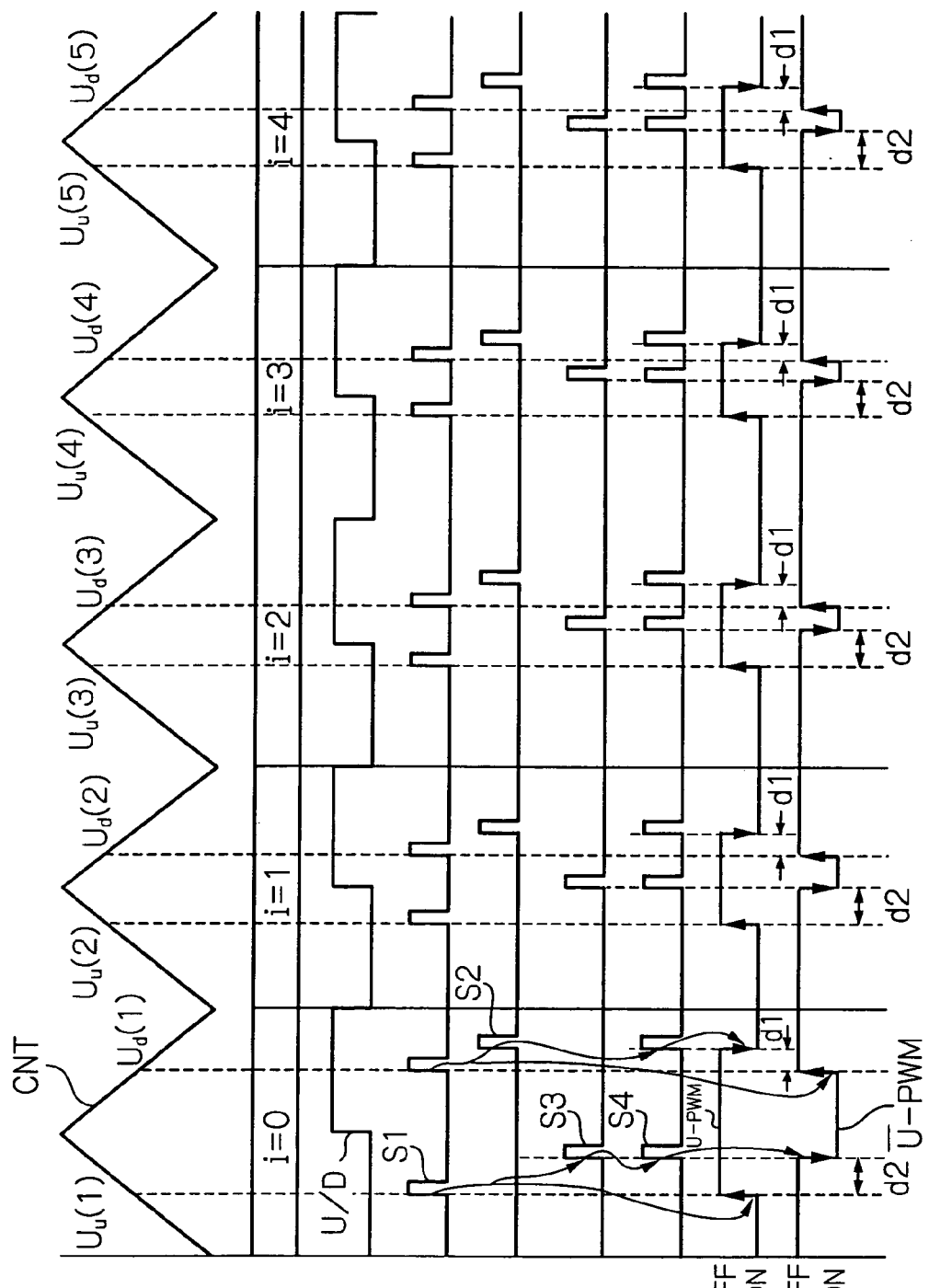
FIGS. 11A through 11H are timing diagrams showing the signals of the apparatus of FIG. 10.

The signals of the apparatus of FIG. 10 are shown in FIGS. 11A through 11H. That is, when the counting direction signal U/D is "1", the coincidence signal S1 of the comparator 101 passes through the gate circuit 201 to reach the delay circuit 104, thus generating the delayed coincidence signal S2 as shown in FIG. 11D. On the other hand, when the counting direction signal U/D is "0", the coincidence signal S1 of the comparator 101 passes through the gate circuit 202 to reach the delay circuit 105, thus generating the delayed coincidence signal S3 as shown in FIG. 11E. Even in this case, the same U-phase PWM signal and the same /U-phase PWM signal can be obtained as shown in FIGS. 11G and 11H.

In FIG. 3, when the coincidence signal S1 is generated from the comparator 102, both of the delay circuits 104 and 105 are operated. On the other hand, in FIG. 10, when the coincidence signal S1 is generated from the comparator 102, only one of the delay circuits (down counters) 104 and 105 is operated.

Thus, in the second embodiment, the power consumption can be decreased, and the noise can be decreased, as compared with the first embodiment.

Figure 12:
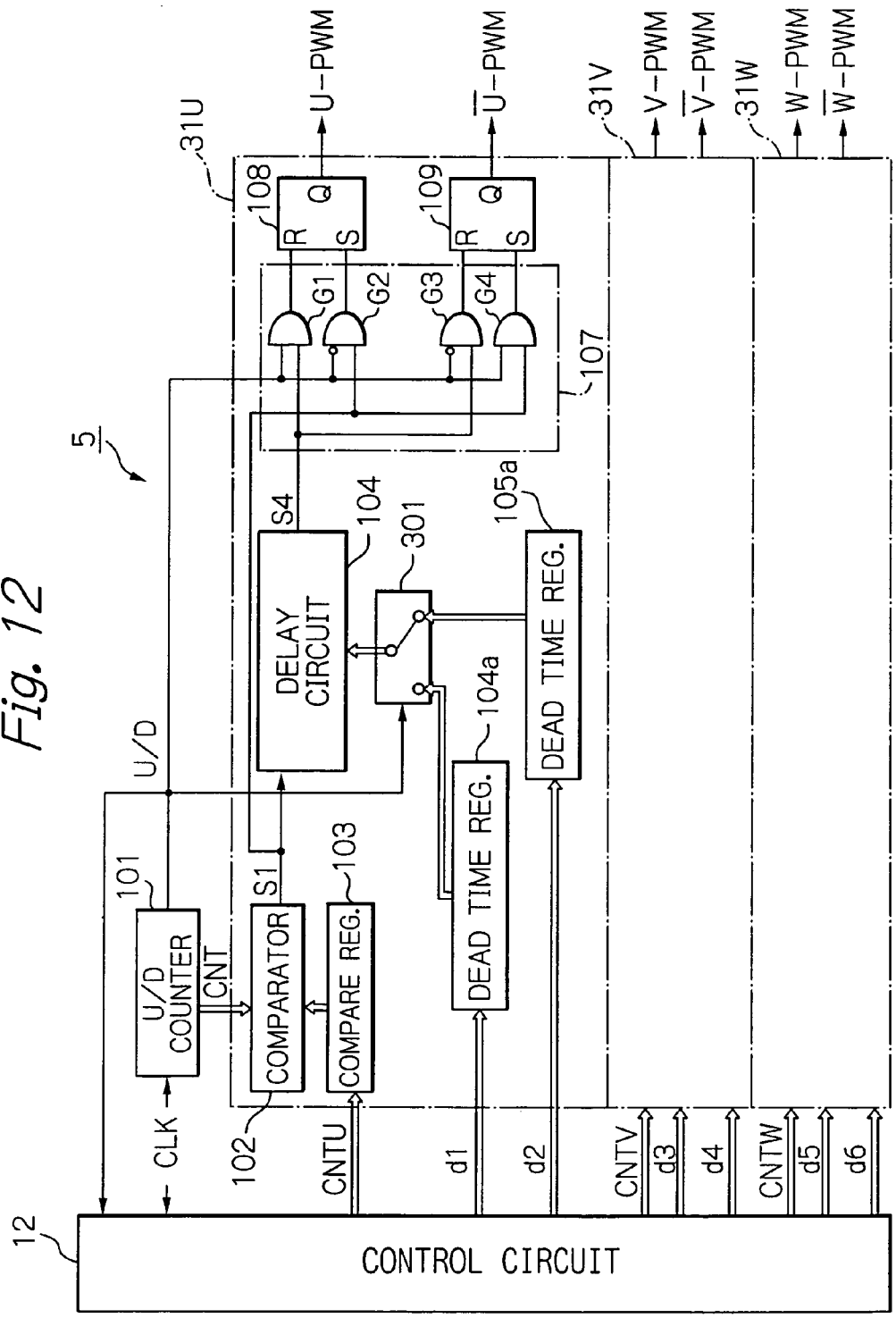
FIG. 12 is a circuit diagram illustrating a third embodiment of the three-phase PWM signal generating apparatus according to the present invention.

In FIG. 12, which illustrates a third embodiment of the three-phase PWM signal generating apparatus according to the present invention, the U-phase PWM signal generating section 21U, the V-phase PWM signal generating section 21V and the W-phase PWM signal generating section 21W of FIG. 10 are replaced by a U-phase PWM signal generating section 31U, a V-phase PWM signal generating section 31V and a W-phase PWM signal generating section 31W, respectively.

In the U-phase PWM signal generating section 31U, the gate circuits 201 and 202 of FIG. 10 are replaced by a selection circuit 301, and the delay circuit 105 and the OR circuit 106 of FIG. 10 are deleted.

Figure 13:
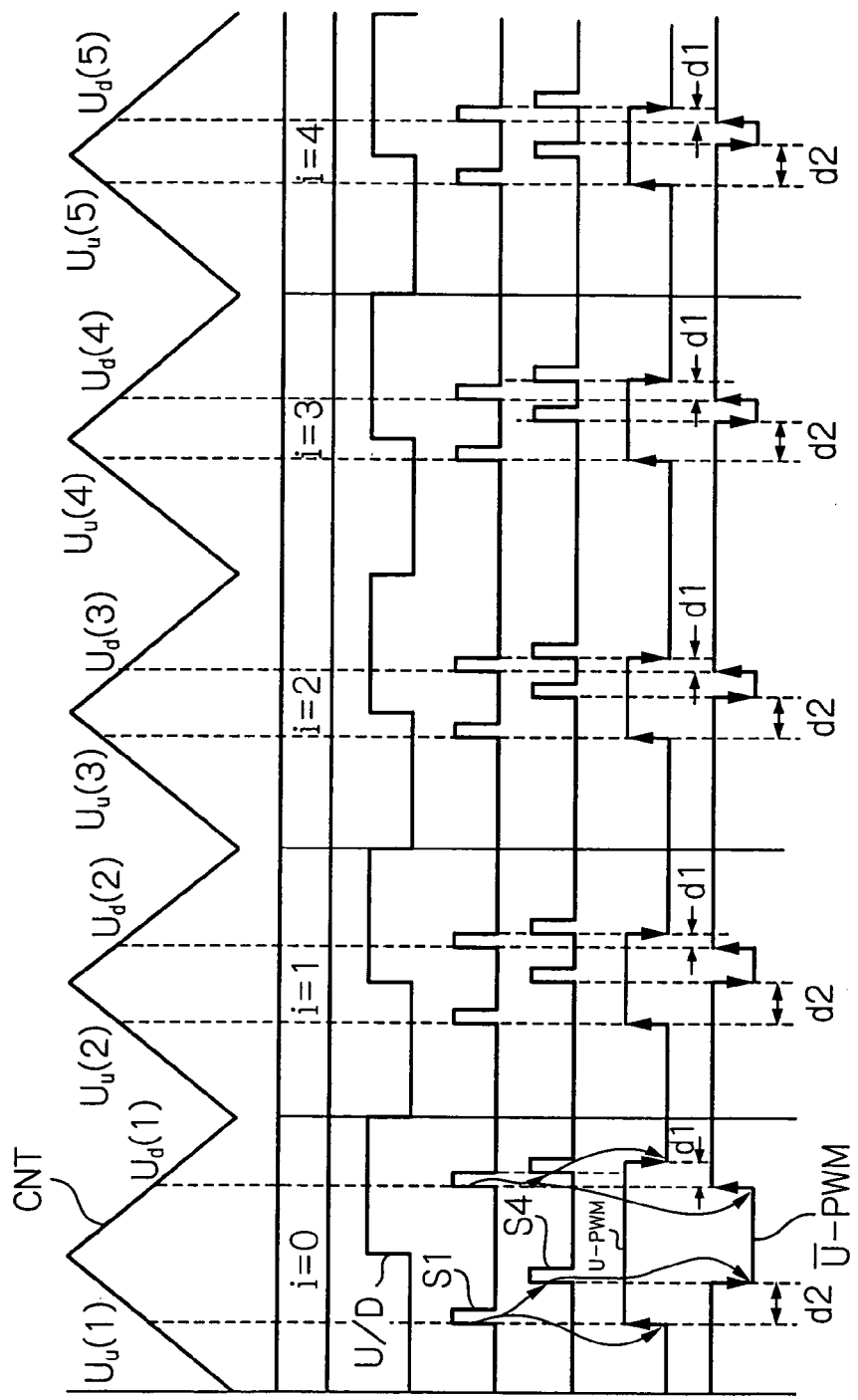
FIGS. 13A through 13F are timing diagrams showing the signals of the apparatus of FIG. 11.

The signals of the apparatus of FIG. 12 are shown in FIGS. 13A through 13H. That is, when the counting direction signal U/D is "1", the switch circuit 301 selects the dead time d1 of the dead time register 104a, thus generating the delayed signal S4 by the dead time d1 as shown in FIG. 13D. On the other hand, when the counting direction signal U/D is "0", the dead time d2 of the dead time register 105a is selected, thus generating the delayed signal S4 by the dead time d2 as shown in FIG. 13D. Even in this case, the same U-phase PWM signal and the same /U-phase PWM signal can be obtained as shown in FIGS. 13E and 13F.

In FIG. 10, both of the delay circuits 104 and 105 are provided. On the other hand, in FIG. 12, only the delay circuit 104 is provided.

Thus, in the third embodiment, the manufacturing cost can be decreased as compared with the first embodiment.

Figure 14:
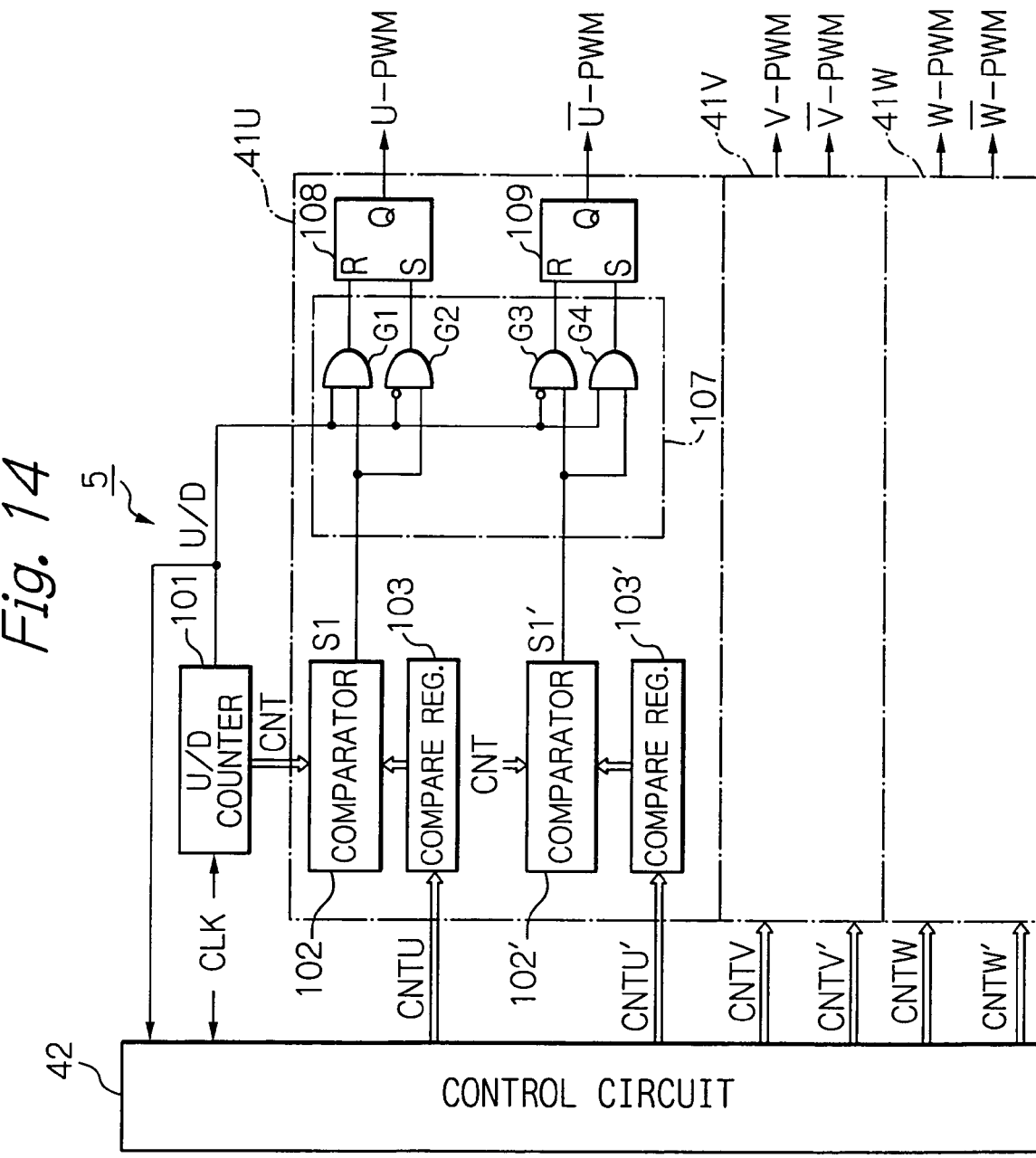
FIG. 14 is a block circuit diagram illustrating a fourth embodiment of the three-phase PWM signal generating apparatus according to the present invention.

In FIG. 14, which illustrates a fourth embodiment of the three-phase PWM signal generating apparatus according to the present invention, the U-phase PWM signal generating section 11U, the V-phase PWM signal generating section 11V, the W-phase PWM signal generating section 11W and the control circuit 12 of FIG. 3 are replaced by a U-phase PWM signal generating section 41U, a V-phase PWM signal generating section 41V, a W-phase PWM signal generating section 41W and a control circuit 42, respectively.

In the U-phase PWM signal generating section 41U, the delay circuits 104 and 105, the dead time registers 104a and 105a and the OR circuit 106 of FIG. 3 are deleted, and a comparator 102' and a compare register 103' are added to the elements of the U-phase PWM signal generating section 11U of FIG. 3.

The comparator 102 compares the value CNT of the triangular carrier signal with a reference value CNTU stored in the compare register 103. As a result, when the value CNT of the triangular carrier signal coincides with the reference value CNTU of the compare register 103, the comparator 102 generates a coincidence signal S1 as shown in FIG. 15C.

The coincidence signal S1 is supplied as a set signal and a reset signal via the gate circuits G1 and G2 of the selection circuit 107 to the RS-type flip-flop 108.

For example, when the counting direction signal U/D is "0" (up count state), the gate circuit G2 is activated by the counting direction signal U/D. Therefore, the signal S1 passes through the gate circuit G2 to set the RS-type flip-flop 108, so that the U-phase PWM signal is made "1" (OFF level) as shown in FIG. 15E.

On the other hand, when the counting direction signal U/D is "1" (down count state), the gate circuit G1 is activated by the counting direction signal U/D. Therefore, the signal S1 passes through the gate circuit G1 to reset the RS-type flip-flop 108, so that the U-phase PWM signal is made "0" (ON level) as shown in FIG. 15E.

Similarly, the comparator 102' compares the value CNT of the triangular carrier signal with a reference value CNTU' stored in the compare register 103'. As a result, when the value CNT of the triangular carrier signal coincides with the reference value CNTU' of the compare register 103', the comparator 102' generates a coincidence signal S1' as shown in FIG. 15D.

The coincidence signal S1' is supplied as a set signal and a reset signal via the gate circuits G3 and G4 of the selection circuit 107 to the RS-type flip-flop 109.

For example, when the counting direction signal U/D is "0" (up count state), the gate circuit G3 is activated by the counting direction signal U/D. Therefore, the signal S1' passes through the gate circuit G3 to reset the RS-type flip-flop 109, so that the /U-phase PWM signal is made "0" (ON level) as shown in FIG. 15F.

On the other hand, when the counting direction signal U/D is "1" (down count state), the gate circuit G4 is activated by the counting direction signal U/D. Therefore, the signal S1' passes through the gate circuit G4 to set the RS-type flip-flop 109, so that the /U-phase PWM signal is made "1" (OFF level) as shown in FIG. 15F.

In the above-mentioned state, if a difference between the set timing of the RS-type flip-flop 109 and the reset timing of the RS-type flip-flop 108 is set to be a dead time d1, the ON timing of the U-phase PWM signal can be assumed to be delayed by the dead time d1.

Also, if a difference between the set timing of the RS-type flip-flop 108 and the reset timing of the RS-type flip-flop 109 is set to be a dead time d2, the ON timing of the /U-phase PWM signal can be assumed to be delayed by the dead time d2.

Figure 16B:
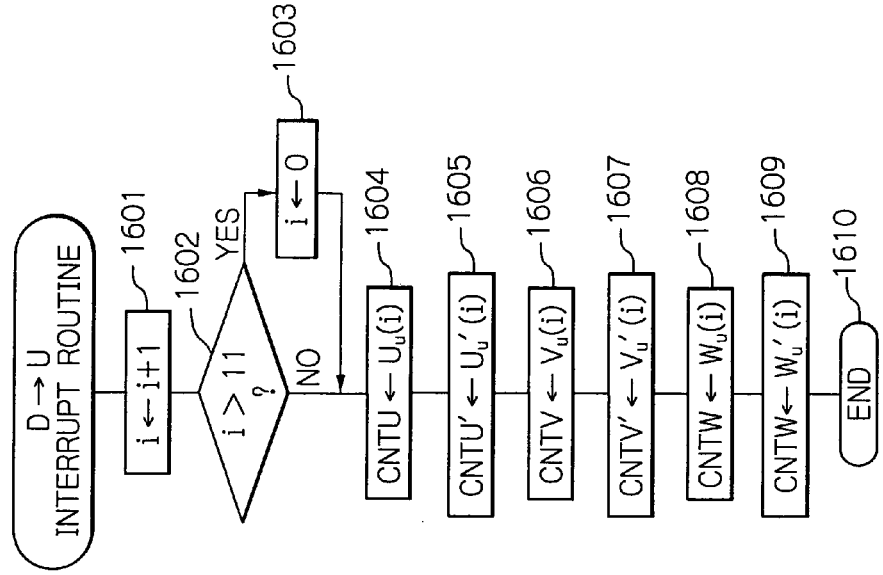
FIGS. 16A and 16B are flowcharts for explaining setting methods of the reference values of the compare registers of FIG. 14.
Figure 16A:
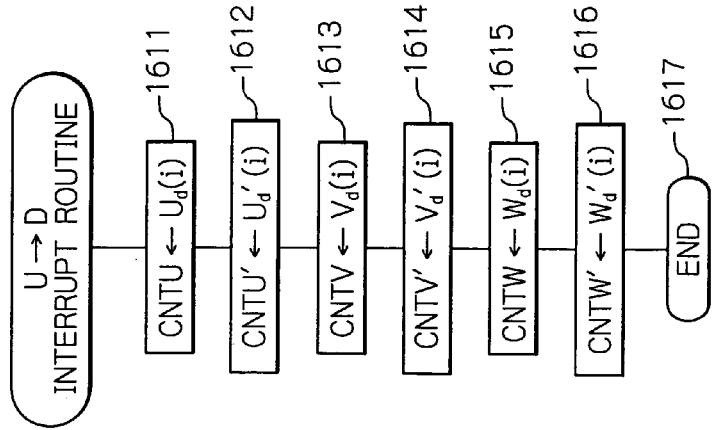

The reference values CNTU and CNTU' of the compare registers 103 and 103' as well as the reference values CNTV and CNTV' of the compare registers (not shown) for the V-phase PWM signal generating section 41V and the reference values CNTW and CNTW' of the compare registers (not shown) for the W-phase PWM signal generating section 41W are set by interrupt routines as illustrated in FIGS. 16A and 16B.

The interrupt routine of FIG. 16A is started every time the counting direction signal U/D is switched from "1" (down counting state) to "0" (up counting state).

First, at step 1601, a value i is counted up by +1.

Next, at step 1602, it is determined whether or not i>11 is satisfied. Only when i>11, does the control proceed to step 1603 which clears the value i, i.e., i←0. Otherwise, the control proceeds directly to step 1604.

At step 1604,
CNTU←$U_u(i)$

Then, the reference value CNTU is set in the compare register 103.

At step 1605,
CNTU'←$U'_u(i)$

Then, the reference value CNTU' is set in the compare register 103'.

Next, at step 1606,
CNTV←$V_u(i)$

Then, the reference value CNTV is set in the compare register of the V-phase PWM signal generating section 41V.

Next, at step 1607,
CNTV'←$V'_u(i)$

Then, the reference value CNTV' is set in the compare register of the V-phase PWM signal generating section 41V.

Next, at step 1608,
CNTW←$W_u(i)$

Then, the reference value CNTW is set in the compare register of the W-phase PWM signal generating section 41W.

Next, at step 1609,
CNTW'←$W'_u(i)$

Then, the reference value CNTW' is set in the compare register of the W-phase PWM signal generating section 41W.

Thus, the flowchart of FIG. 16A is completed by step 1610.

Note that the reference values $U_u(0), U_u(1), \ldots, U_u(11)$; $U_d(0), U'_u(1), \ldots, U'_u(11); V_u(0), V_u(1), \ldots, V_u(11); V'_u(0), V'_u(1), \ldots, V'_u(11); W_u(0), W_u(1), \ldots, W_u(11);$ and $W'_u(0), W'_u(1), \ldots, W'_u(11)$ are predetermined in accordance with the abilities of the power transistors 21, 22, 23, 24, 25 and 26, and are stored in a ROM of the control circuit 42.

The interrupt routine of FIG. 16B is started every time the counting direction signal U/D is switched from "0" (up counting state) to "1" (down counting state).

First, at step 1611,
CNTU←$U_d(i)$

Then, the reference value CNTU is set in the compare register 103.

First, at step 1612,
CNTU'←$U'_d(i)$

Then, the reference value CNTU' is set in the compare register 103'.

Next, at step 1613,
CNTV←$V_d(i)$

Then, the reference value CNTV is set in the compare register of the V-phase PWM signal generating section 41V.

Next, at step 1614,
CNTV'←$V'_d(i)$

Then, the reference value CNTV' is set in the compare register of the V-phase PWM signal generating section 41V.

Next, at step 1615,
CNTW←$W_d(i)$

Then, the reference value CNTW is set in the compare register of the W-phase PWM signal generating section 11W.

Next, at step 1616,
CNTW'←$W'_d(i)$

Then, the reference value CNTW' is set in the compare register of the W-phase PWM signal generating section 11W.

Thus, the flowchart of FIG. 16B is completed by step 1617.

Note that the reference values $U_d(0), U_d(1), \ldots, U_d(11)$; $U'_d(0), U'_d(1), \ldots, U'_d(11); V_d(0), V_d(1), \ldots, V_{d(11)}; V'_d(0), V'_d(1), \ldots, V'_d(11); W_d(0), W_d(1), \ldots, W_d(1);$ and $W'_d(0), W'_d(1), \ldots, W'_d(11)$ are also predetermined in accordance with the abilities of the power transistors 21, 22, 23, 24, 25 and 26, and are stored in the ROM of the control circuit 42.

In the fourth embodiment, although the comparator 102' and the compare register 103' are added, since the delay circuits 104 and 105, the dead time registers 104a and 105a and the OR circuit 106 of FIG. 3 are unnecessary, the manufacturing cost can be decreased.

Figure 17:
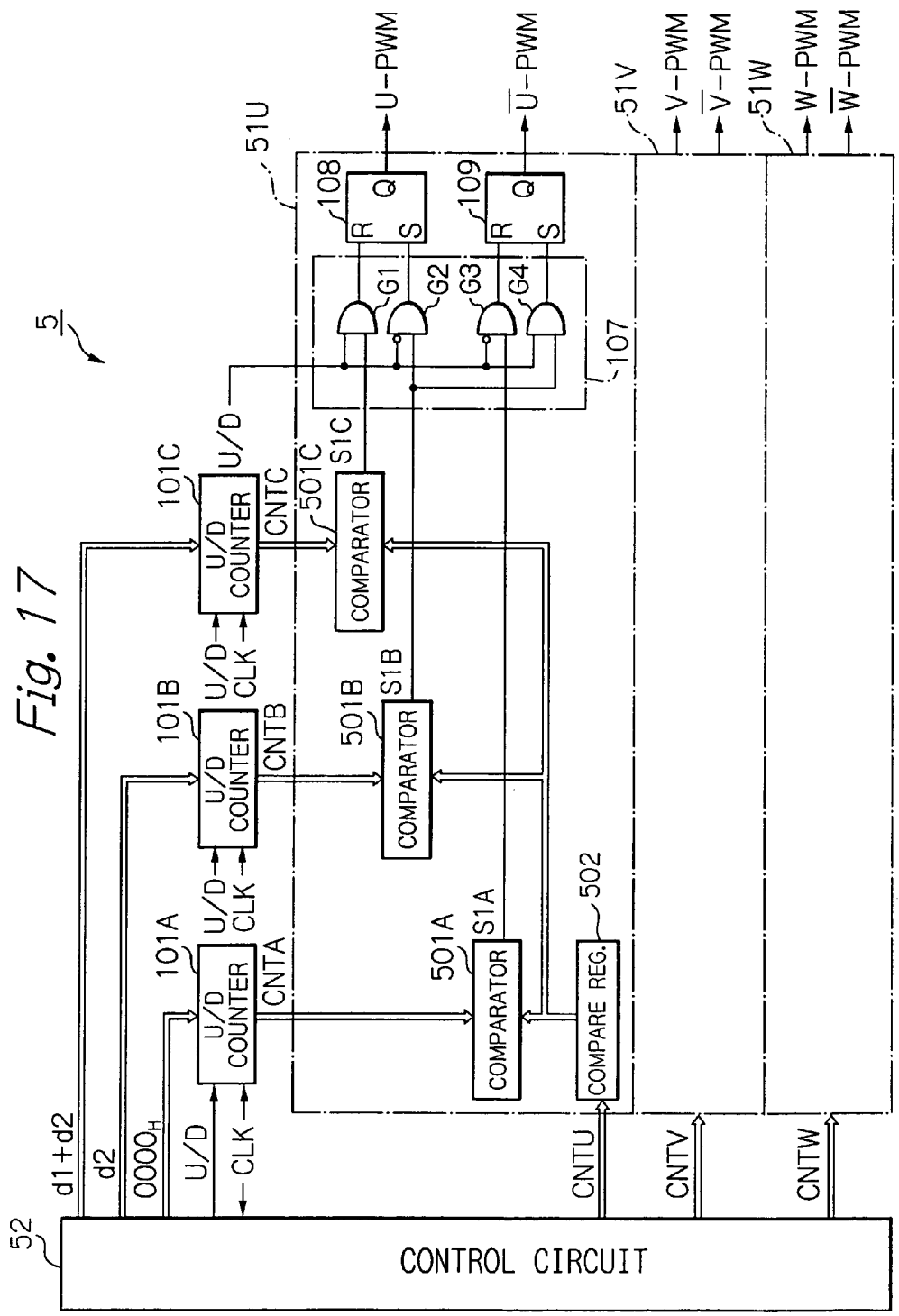
FIG. 17 is a block circuit diagram illustrating a fifth embodiment of the three-phase PWM signal generating apparatus according to the present invention.

In FIG. 17, which illustrates a fifth embodiment of the three-phase PWM signal generating apparatus according to the present invention, the U-phase PWM signal generating section 11U, the V-phase PWM signal generating section 11V, the W-phase PWM signal generating section 11W and the control circuit 12 of FIG. 3 are replaced by a U-phase PWM signal generating section 51U, a V-phase PWM signal generating section 51V, a W-phase PWM signal generating section 51W and a control circuit 52, respectively.

Figure 18:
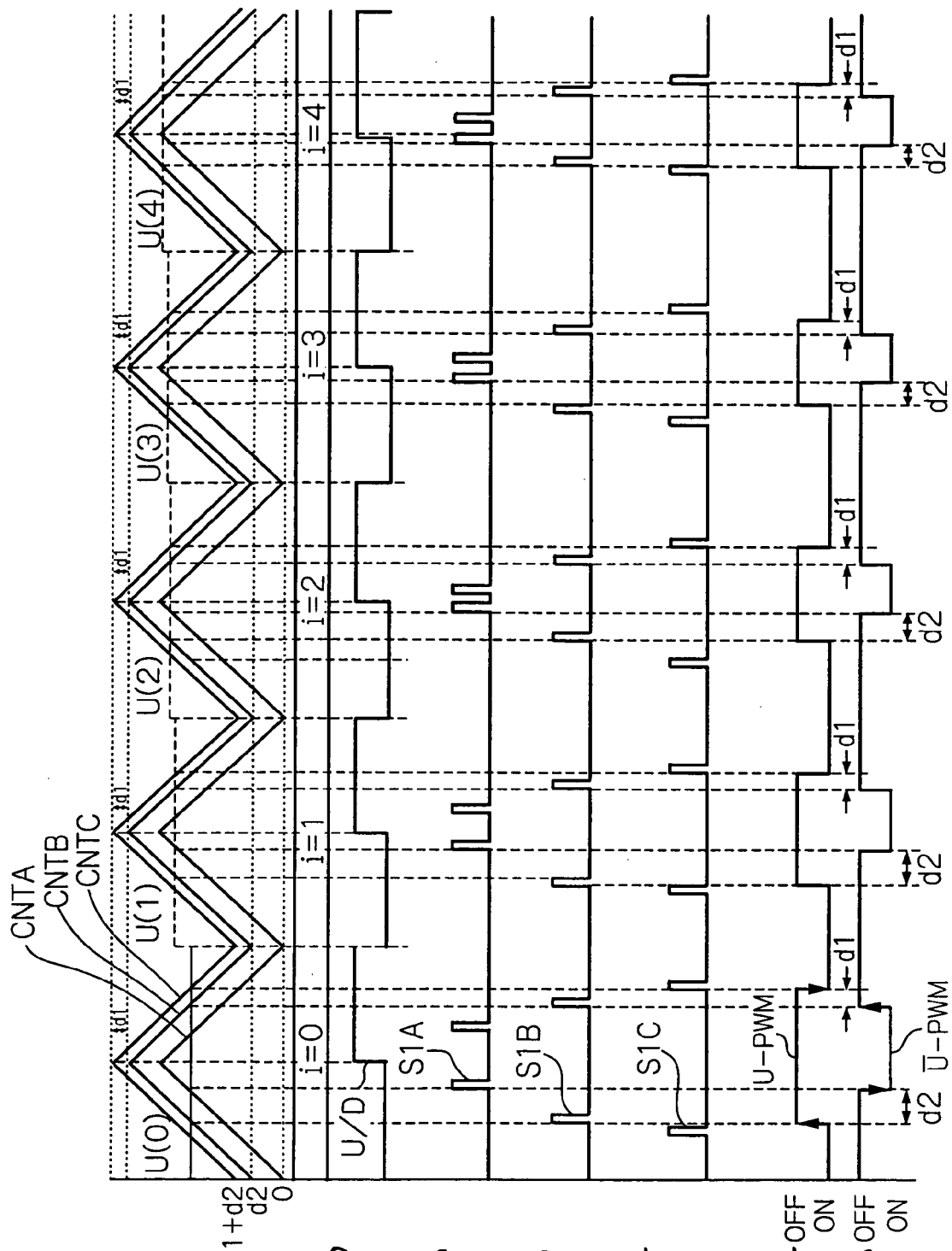
FIGS. 18A through 18G are timing diagrams showing the signals of the apparatus of FIG. 17.

In FIG. 17, up/down counters 101A, 101B and 101C are provided instead of the up/down counter 101 of FIG. 3. An initial value $0000_H$ is set by the control circuit 52 in the up/down counter 101A, a dead time d2 is set by the control circuit 52 in the up/down counter 101B, and a dead time (d1+d2) is set by the control circuit 52 in the up/down counter 101C. The counting direction U/D of the up/down counters 101A, 101B and 101C are controlled by the control circuit 52, so that the up/down counters 101A, 101B and 101C generate triangular carrier signals whose values are CNTA, CNTB and CNTC, respectively, as shown in FIG. 18A, in synchronization with a counting direction signal U/D as shown in FIG. 18B.

In the U-phase PWM signal generating section 51U, the delay circuits 104 and 105, the dead time registers 104a and 105a and the OR circuit 106 of FIG. 3 are deleted, and comparators 501A, 501B and 501C and a compare register 502 are provided instead of the comparator 102 and the compare register 103 of FIG. 3.

The comparator 501A compares the value CNTA of the triangular carrier signal of the up/down counter 101A with a reference value CNTU stored in the compare register 502. As a result, when the value CNTA of the triangular carrier signal of the up/down counter 101A coincides with the reference value CNTU of the compare register 502, the comparator 501A generates a coincidence signal S1A as shown in FIG. 18C.

The comparator 501B compares the value CNTB of the triangular carrier signal of the up/down counter 101B with the reference value CNTU stored in the compare register 502. As a result, when the value CNTB of the triangular carrier signal of the up/down counter 101B coincides with the reference value CNTU of the compare register 502, the comparator 501B generates a coincidence signal S1B as shown in FIG. 18D.

The comparator 501C compares the value CNTC of the triangular carrier signal of the up/down counter 101C with the reference value CNTU stored in the compare register 502. As a result, when the value CNTC of the triangular carrier signal of the up/down counter 101C coincides with the reference value CNTU of the compare register 502, the comparator 501C generates a coincidence signal S1C as shown in FIG. 18E.

The coincidence signals S1B and S1C are supplied as a set signal and a reset signal via the gate circuits G1 and G2 of the selection circuit 107 to the RS-type flip-flop 108.

For example, when the counting direction signal U/D is "0" (up count state), the gate circuit G2 is activated by the counting direction signal U/D. Therefore, the coincidence signal S1B passes through the gate circuit G2 to set the RS-type flip-flop 108, so that the U-phase PWM signal is made "1" (OFF level) as shown in FIG. 18F.

On the other hand, when the counting direction signal U/D is "1" (down count state), the gate circuit G1 is activated by the counting direction signal U/D. Therefore, the coincidence signal S1C passes through the gate circuit G1 to reset the RS-type flip-flop 108, so that the U-phase PWM signal is made "0" (ON level) as shown in FIG. 18F.

The coincidence signals S1B and S1A are supplied as a set signal and a reset signal via the gate circuits G3 and G4 of the selection circuit 107 to the RS-type flip-flop 109.

For example, when the counting direction signal U/D is "0" (up count state), the gate circuit G3 is activated by the counting direction signal U/D. Therefore, the signal S1A passes through the gate circuit G3 to reset the RS-type flip-flop 109, so that the /U-phase PWM signal is made "0" (ON level) as shown in FIG. 18G.

On the other hand, when the counting direction signal U/D is "1" (down count state), the gate circuit G4 is activated by the counting direction signal U/D. Therefore, the signal S1B passes through the gate circuit G4 to set the RS-type flip-flop 109, so that the /U-phase PWM signal is made "1" (OFF level) as shown in FIG. 18G.

In the above-mentioned state, since a difference between the set timing of the RS-type flip-flop 109 and the reset timing of the RS-type flip-flop 108 is the dead time d1 between the values CNTB and CNTC, the ON timing of the U-phase PWM signal can be assumed to be delayed by the dead time d1.

Also, since a difference between the set timing of the RS-type flip-flop 108 and the reset timing of the RS-type flip-flop 109 is the dead time d2 between the values CNTB and CNTA, the ON timing of the /U-phase PWM signal can be assumed to be delayed by the dead time d2.

Figure 19:
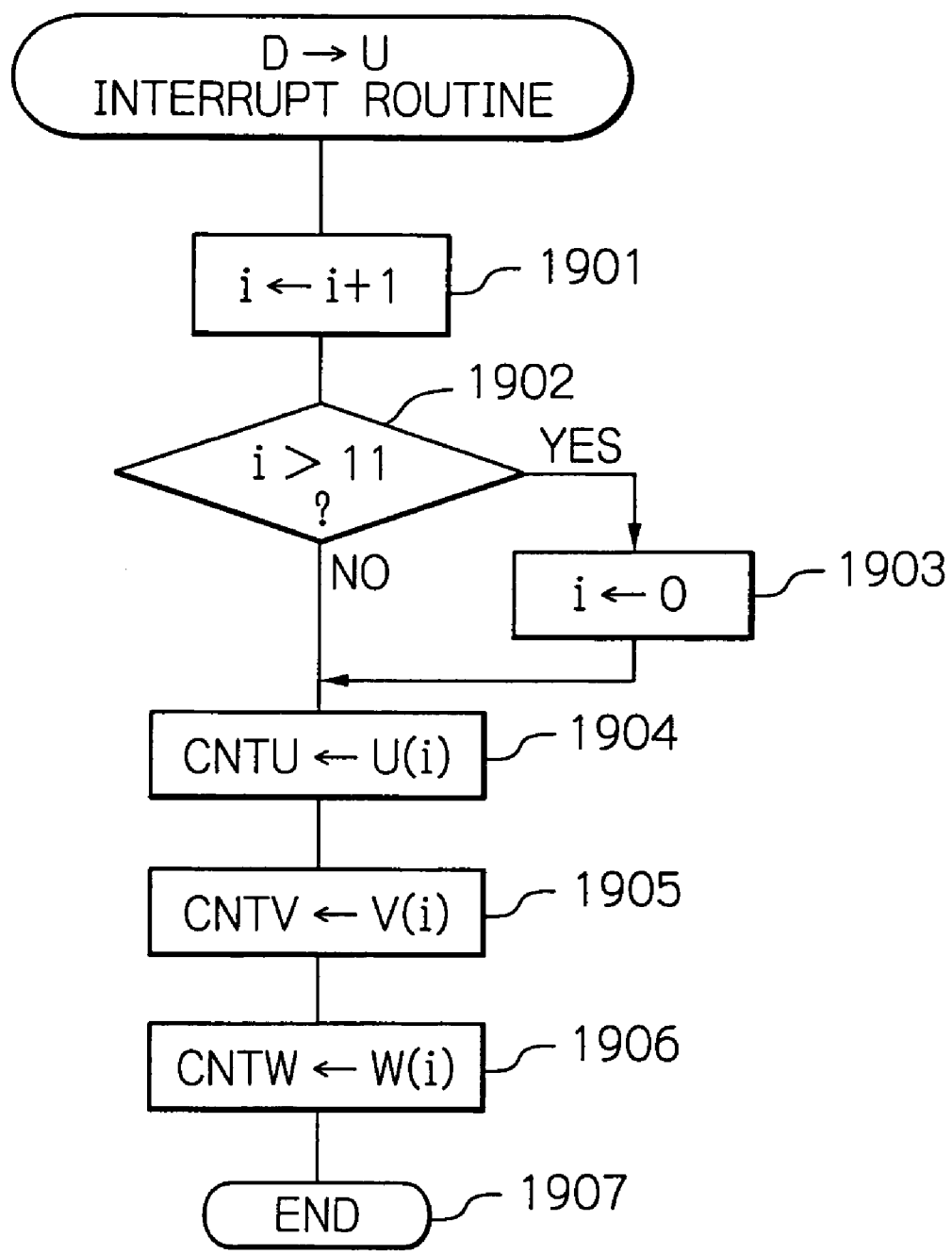
FIG. 19 is a flowchart for explaining a setting method of the reference values of the compare registers of FIG. 17.

The reference value CNTU of the compare register 502 as well as the reference value CNTV of the compare register (not shown) for the V-phase PWM signal generating section 51V and the reference value CNTW of the compare register (not shown) for the W-phase PWM signal generating section 51W are set by interrupt routines as illustrated in FIG. 19.

The interrupt routine of FIG. 19 is started every time the counting direction signal U/D is switched from "1" (down counting state) to "0" (up counting state).

First, at step 1901, a value i is counted up by +1.

Next, at step 1902, it is determined whether or not i>11 is satisfied. Only when i>11, does the control proceed to step 1903 which clears the value i, i.e., i←0. Otherwise, the control proceeds directly to step 1904.

At step 1904,
CNTU←U(i)
Then, the reference value CNTU is set in the compare register 502.

Next, at step 1906,
CNTV←V(i)
Then, the reference value CNTV is set in the compare register of the V-phase PWM signal generating section 51V.

Next, at step 1906,
CNTW←W(i)
Then, the reference value CNTW is set in the compare register of the W-phase PWM signal generating section 51W.

Thus, the flowchart of FIG. 19 is completed by step 1907.

Note that the reference values U(0), U(1), ..., U(11); V(0), V(1), ..., V(11); and W(0), W(1), ..., W(11) are predetermined in accordance with the abilities of the power transistors 21, 22, 23, 24, 25 and 26, and are stored in a ROM of the control circuit 52.

In the fourth embodiment, although the two up/down counters and the two comparators are added, since the delay circuits 104 and 105, the dead time registers 104a and 105a and the OR circuit 106 of FIG. 3 are unnecessary, the manufacturing cost can be decreased.

In the above-described embodiments adopt a positive polarity control method where the U-phase PWM signal is changed from an ON level via an OFF level to an ON level and the /U-phase PWM signal is changed from an OFF level via an ON level to an OFF level for one period of the triangular carrier signal. In the above-described embodiments, however, a negative polarity control method can be adopted. In this case, the RS-type flip-flop 108 is reset by the output signal of the gate circuit G3 and the RS-type flip-flop 108 is set by the output signal of the gate circuit G4. Also, the RS-type flip-flop 109 is reset by the output signal of the gate circuit G1 and the RS-type flip-flop 109 is set by the output signal of the gate circuit G2. As a result, the U-phase PWM signal is changed from an OFF level via an ON level to an OFF level and the /U-phase PWM signal is changed from an ON level via an OFF level to an ON level for one period of the triangular carrier signal.

As explained above, according to the present invention, since two dead times are individually set, one of the dead times can be optimum for controlling an upper side power transistor of a PWM inverter and the other can be optimum for controlling a lower side power transistor of the PWM inverter.

The invention claimed is:

1. An apparatus for generating complementary first and second pulse width modulation signals, comprising:
a signal generating circuit for generating a first signal for causing said first pulse width signal to switch from an ON level to an OFF level, a second signal for causing said first pulse width signal to switch from the OFF level to the ON level, a third signal for causing said second pulse width signal to switch from the ON level to the OFF level, and a fourth signal for causing said second pulse width signal to switch from the OFF level to the ON level; and a control circuit, connected to said signal generating circuit, for setting a first dead time between said first and fourth signals and a second time between said third and second signals individually.

2. The apparatus as set forth in claim 1, wherein said signal generating circuit comprises:
   an up/down counter, connected to said control circuit, for counting pulses of a clock signal to generate a count value and a counting direction signal;
   a compare register, connected to said control circuit, for storing a reference value;
   a comparator, connected to said up/down counter and said compare register, for comparing said count value with said reference value to generate a coincidence signal when said count value coincides with said reference value;
   first and second dead time registers, connected to said control circuit, for storing said first and second dead times, respectively;
   a first delay circuit, connected to said comparator and said first dead time register, for delaying said coincidence signal by said first dead time to generate a first delayed coincidence signal;
   a second delay circuit, connected to said comparator and said second dead time register, for delaying said coincidence signal by said second dead time to generate a second delayed coincidence signal;
   a selection circuit, connected to said up/down counter, said comparator and said first and second delay circuits, for selecting signals from said coincidence signal and said first and second delayed coincidence signals in accordance with said counting direction signal; and
   a pulse width modulation signal generating circuit, connected to said selection circuit, for generating said complementary first and second pulse width modulation signals in accordance with the signals selected by said selection circuit.

3. The apparatus as set forth in claim 2, wherein said signal generating circuit further comprises:
   a first gate circuit, connected between said comparator and said first delay circuit, for passing said coincidence signal therethrough when said counting direction signal is in a first state;
   a second gate circuit, connected between said comparator and said second delay circuit, for passing said coincidence signal therethrough when said counting direction signal is in a second state; and
   a logic OR circuit connected between said first and second delay circuits and said selection circuit.

4. The apparatus as set forth in claim 1, wherein said signal generating circuit comprises:
   an up/down counter, connected to said control circuit, for counting pulses of a clock signal to generate a count value and a counting direction signal;
   a compare register, connected to said control circuit, for storing a reference value;
   a comparator, connected to said up/down counter and said compare register, for comparing said count value with said reference value to generate a coincidence signal when said count value coincides with said reference value;
   first and second dead time registers, connected to said control circuit, for storing said first and second dead times, respectively;
   a first selection circuit, connected to said up/down counter and said first and second dead time registers, for selecting one of said first and second dead times in accordance with said counting direction signal;
   a delay circuit, connected to said comparator and said first selection circuit, for delaying said coincidence signal by a selected one of said first and second dead times by said first selection circuit to generate a delayed coincidence signal;
   a second selection circuit, connected to said up/down counter, said comparator and said delay circuit, for selecting signals from said coincidence signal and said delayed coincidence signal in accordance with said counting direction signal; and
   a pulse width modulation signal generating circuit, connected to said second selection circuit, for generating said complementary first and second pulse width modulation signals in accordance with the signals selected by said second selection circuit.

5. The apparatus as set forth in claim 1, wherein said signal generating circuit comprises:
   an up/down counter, connected to said control circuit, for counting pulses of a clock signal to generate a count value and a counting direction signal;
   a first compare register, connected to said control circuit, for storing first and second reference values corresponding to said first and second signals, respectively, in accordance with said counting direction signal;
   a first comparator, connected to said up/down counter and said first compare register, for comparing said count value with said first and second reference values to generate first and second coincidence signals when said count value coincides with said first and second reference values, respectively;
   a second compare register, connected to said control circuit, for storing third and fourth reference values corresponding to said third and fourth signals, respectively, in accordance with said counting direction signal;
   a second comparator, connected to said up/down counter and said second compare register, for comparing said count value with said third and fourth reference values to generate third and fourth coincidence signals when said count value coincides with said third and fourth reference values, respectively;
   a selection circuit, connected to said up/down counter and said first and second comparators, for selecting signals from said first, second, third and fourth coincidence signals in accordance with said counting direction signal; and
   a pulse width modulation signal generating circuit, connected to said selection circuit, for generating said complementary first and second pulse width modulation signals in accordance with the signals selected by said selection circuit.

6. The apparatus as set forth in claim 1, wherein said signal generating circuit comprises:
   a first up/down counter, connected to said control circuit, for counting pulses of a clock signal to generate a first count value in accordance with a counting direction signal from said control circuit;
   a second up/down counter, connected to said control circuit, for counting the pulses of said clock signal to generate a second count value in accordance with said counting direction signal, said second count value including an offset amount corresponding to said second dead time with respect to said first count value;
   a third up/down counter, connected to said control circuit, for counting the pulses of said clock signal to generate a third count value in accordance with said counting direction signal, said third count value including an offset amount corresponding to a sum of said first and second dead times with respect to said first count value;
a compare register, connected to said control circuit, for storing a reference value;
a first comparator, connected to said first up/down counter and said compare register, for comparing said first count value with said reference value to generate a first coincidence signal when said first count value coincides with said reference value;
a second comparator, connected to said second up/down counter and said compare register, for comparing said second count value with said reference value to generate a second coincidence signal when said second count value coincides with said reference value;
a third comparator, connected to said second up/down counter and said compare register, for comparing said third count value with said reference value to generate a third coincidence signal when said third count value coincides with said reference value;
a selection circuit, connected to said control circuit and said first, second and third comparators, for selecting signals from said first, second and third coincidence signals in accordance with said counting direction signal; and
a pulse width modulation signal generating circuit, connected to said selection circuit, for generating said complementary first and second pulse width modulation signals in accordance with the signals selected by said selection circuit.

7. An apparatus for generating complementary U- and /U-phase pulse width modulation signals, complementary V- and /V-phase pulse width modulation signals and complementary W- and /W-phase pulse width modulation signals, comprising:
a U-phase signal generating circuit for generating a first signal for causing said U-phase pulse width signal to switch from an ON level to an OFF level, a second signal for causing said U-phase pulse width signal to switch from the OFF level to the ON level, a third signal for causing said /U-phase pulse width signal to switch from the ON level to the OFF level, and a fourth signal for causing said /U-phase pulse width signal to switch from the OFF level to the ON level;
a V-phase signal generating circuit for generating a fifth signal for causing said V-phase pulse width signal to switch from the ON level to the OFF level, a sixth signal for causing said V-phase pulse width signal to switch from the OFF level to the ON level, a seventh signal for causing said /V-phase pulse width signal to switch from the ON level to the OFF level, and an eighth signal for causing said /V-phase pulse width signal to switch from the OFF level to the ON level;
a W-phase signal generating circuit for generating a ninth signal for causing said W-phase pulse width signal to switch from the ON level to the OFF level, a tenth signal for causing said W-phase pulse width signal to switch from the OFF level to the ON level, an eleventh signal for causing said /W-phase pulse width signal to switch from the ON level to the OFF level, and a twelfth signal for causing said /W-phase pulse width signal to switch from the OFF level to the ON level;
a control circuit, connected to said U-phase, V-phase and W-phase signal generating circuits, for setting a first dead time between said first and fourth signals and a second time between said third and second signals individually, setting a third dead time between said fifth and eighth signals and a fourth time between said seventh and sixth signals individually, and setting a fifth dead time between said ninth and twelfth signals and a sixth time between said eleventh and tenth signals individually.

8. An apparatus for generating complementary U- and /U-phase pulse width modulation signals, complementary V- and /V-phase pulse width modulation signals and complementary W- and /W-phase pulse width modulation signals, comprising:
a control circuit;
an up/down counter, connected to said control circuit, for counting pulses of a clock signal to generate a count value and a counting direction signal;
a U-phase compare register, connected to said control circuit, for storing a U-phase reference value;
a V-phase compare register, connected to said control circuit, for storing a V-phase reference value;
a W-phase compare register, connected to said control circuit, for storing a W-phase reference value;
a U-phase comparator, connected to said up/down counter and said U-phase compare register, for comparing said count value with said U-phase reference value to generate a U-phase coincidence signal when said count value coincides with said U-phase reference value;
a V-phase comparator, connected to said up/down counter and said V-phase compare register, for comparing said count value with said V-phase reference value to generate a V-phase coincidence signal when said count value coincides with said V-phase reference value;
a W-phase comparator, connected to said up/down counter and said W-phase compare register, for comparing said count value with said W-phase reference value to generate a W-phase coincidence signal when said count value coincides with said W-phase reference value;
first, second, third and fourth dead time registers, connected to said control circuit, for storing said first, second, third and fourth dead times, respectively;
a first delay circuit, connected to said U-phase comparator and said first dead time register, for delaying said U-phase coincidence signal by said first dead time to generate a first delayed coincidence signal;
a second delay circuit, connected to said U-phase comparator and said second dead time register, for delaying said U-phase coincidence signal by said second dead time to generate a second delayed coincidence signal;
a third delay circuit, connected to said V-phase comparator and said third dead time register, for delaying said V-phase coincidence signal by said third dead time to generate a third delayed coincidence signal;
a fourth delay circuit, connected to said V-phase comparator and said fourth dead time register, for delaying said V-phase coincidence signal by said fourth dead time to generate a fourth delayed coincidence signal;
a fifth delay circuit, connected to said W-phase comparator and said fifth dead time register, for delaying said W-phase coincidence signal by said fifth dead time to generate a fifth delayed coincidence signal;
a sixth delay circuit, connected to said W-phase comparator and said sixth dead time register, for delaying said W-phase coincidence signal by said sixth dead time to generate a sixth delayed coincidence signal;
a U-phase selection circuit, connected to said up/down counter, said U-phase comparator and said first and second delay circuits, for selecting signals from said U-phase coincidence signal and said first and second delayed coincidence signals in accordance with said counting direction signal;
a V-phase selection circuit, connected to said up/down counter, said V-phase comparator and said third and fourth delay circuits, for selecting signals from said V-phase coincidence signal and said third and fourth delayed coincidence signals in accordance with said counting direction signal;
a W-phase selection circuit, connected to said up/down counter, said W-phase comparator and said fifth and sixth delay circuits, for selecting signals from said W-phase coincidence signal and said fifth and sixth delayed coincidence signals in accordance with said counting direction signal;
a U-phase pulse width modulation signal generating circuit, connected to said U-phase selection circuit, for generating said complementary U- and /U-phase pulse width modulation signals in accordance with the signals selected by said U-phase selection circuit;
a V-phase pulse width modulation signal generating circuit, connected to said V-phase selection circuit, for generating said complementary V- and /V-phase pulse width modulation signals in accordance with the signals selected by said V-phase selection circuit; and
a W-phase pulse width modulation signal generating circuit, connected to said W-phase selection circuit, for generating said complementary W- and /W-phase pulse width modulation signals in accordance with the signals selected by said W-phase selection circuit.

9. The apparatus as set forth in claim 8, wherein said U-phase signal generating circuit further comprises:
a first gate circuit, connected between said U-phase comparator and said first delay circuit, for passing said U-phase coincidence signal therethrough when said counting direction signal is in a first state; and
a second gate circuit, connected between said U-phase comparator and said second delay circuit, for passing said U-phase coincidence signal therethrough when said counting direction signal is in a second state,
said V-phase signal generating circuit further comprising:
a third gate circuit, connected between said V-phase comparator and said third delay circuit, for passing said V-phase coincidence signal therethrough when said counting direction signal is in the first state; and
a fourth gate circuit, connected between said V-phase comparator and said fourth delay circuit, for passing said V-phase coincidence signal therethrough when said counting direction signal is in the second state,
said W-phase signal generating circuit further comprising:
a fifth gate circuit, connected between said W-phase comparator and said fifth delay circuit, for passing said W-phase coincidence signal therethrough when said counting direction signal is in the first state; and
a sixth gate circuit, connected between said W-phase comparator and said sixth delay circuit, for passing said W-phase coincidence signal therethrough when said counting direction signal is in the second state;
a U-phase logic OR circuit connected between said first and second delay circuits and said U-phase selection circuit;
a V-phase logic OR circuit connected between said third and fourth delay circuits and said V-phase selection circuit; and
a W-phase logic OR circuit connected between said fifth and sixth delay circuits and said W-phase selection circuit.

10. An apparatus for generating complementary U- and /U-phase pulse width modulation signals, complementary V- and /V-phase pulse width modulation signals and complementary W- and /W-phase pulse width modulation signals, comprising:
a control circuit;
an up/down counter, connected to said control circuit, for counting pulses of a clock signal to generate a count value and a counting direction signal;
a U-phase compare register, connected to said control circuit, for storing a U-phase reference value;
a V-phase compare register, connected to said control circuit, for storing a V-phase reference value;
a W-phase compare register, connected to said control circuit, for storing a W-phase reference value;
a U-phase comparator, connected to said up/down counter and said U-phase compare register, for comparing said count value with said U-phase reference value to generate a U-phase coincidence signal when said count value coincides with said U-phase reference value;
a V-phase comparator, connected to said up/down counter and said V-phase compare register, for comparing said count value with said V-phase reference value to generate a V-phase coincidence signal when said count value coincides with said V-phase reference value;
a W-phase comparator, connected to said up/down counter and said W-phase compare register, for comparing said count value with said W-phase reference value to generate a W-phase coincidence signal when said count value coincides with said W-phase reference value;
first, second, third, fourth, fifth and sixth dead time registers, connected to said control circuit, for storing said first, second, third, fourth, fifth and sixth dead times, respectively;
a first U-phase selection circuit, connected to said up/down counter and said first and second dead time registers, for selecting one of said first and second dead times in accordance with said counting direction signal;
a first V-phase selection circuit, connected to said up/down counter and said third and fourth dead time registers, for selecting one of said third and fourth dead times in accordance with said counting direction signal;
a first W-phase selection circuit, connected to said up/down counter and said fifth and sixth dead time registers, for selecting one of said fifth and sixth dead times in accordance with said counting direction signal;
a U-phase delay circuit, connected to said U-phase comparator and said first U-phase selection circuit, for delaying said U-phase coincidence signal by a selected one of said first and second dead times by said first U-phase selection circuit to generate a U-phase delayed coincidence signal;
a V-phase delay circuit, connected to said V-phase comparator and said first V-phase selection circuit, for delaying said V-phase coincidence signal by a selected one of said third and fourth dead times by said first V-phase selection circuit to generate a V-phase delayed coincidence signal;
a W-phase delay circuit, connected to said W-phase comparator and said first W-phase selection circuit, for delaying said W-phase coincidence signal by a selected one of said fifth and sixth dead times by said first W-phase selection circuit to generate a W-phase delayed coincidence signal;
a second U-phase selection circuit, connected to said up/down counter, said comparator and said U-phase delay circuit, for selecting signals from said U-phase coincidence signal and said U-phase delayed coincidence signal in accordance with said counting direction signal;

a second V-phase selection circuit, connected to said up/down counter, said comparator and said V-phase delay circuit, for selecting signals from said V-phase coincidence signal and said V-phase delayed coincidence signal in accordance with said counting direction signal;

a second W-phase selection circuit, connected to said up/down counter, said comparator and said W-phase delay circuit, for selecting signals from said W-phase coincidence signal and said W-phase delayed coincidence signal in accordance with said counting direction signal;

a U-phase pulse width modulation signal generating circuit, connected to said second U-phase selection circuit, for generating said complementary U- and /U-phase pulse width modulation signals in accordance with the signals selected by said second U-phase selection circuit;

a V-phase pulse width modulation signal generating circuit, connected to said second V-phase selection circuit, for generating said complementary V- and /V-phase pulse width modulation signals in accordance with the signals selected by said second V-phase selection circuit; and a W-phase pulse width modulation signal generating circuit, connected to said second W-phase selection circuit, for generating said complementary W- and /W-phase pulse width modulation signals in accordance with the signals selected by said second W-phase selection circuit.

11. An apparatus for generating complementary U- and /U-phase pulse width modulation signals, complementary V- and /V-phase pulse width modulation signals and complementary W- and /W-phase pulse width modulation signals, comprising:

a control circuit;

an up/down counter, connected to said control circuit, for counting pulses of a clock signal to generate a count value and a counting direction signal;

a first U-phase compare register, connected to said control circuit, for storing first and second U-phase reference values in accordance with said counting direction signal;

a first U-phase comparator, connected to said up/down counter and said first U-phase compare register, for comparing said count value with said first and second U-phase reference values to generate first and second U-phase coincidence signals when said count value coincides with said first and second U-phase reference values, respectively;

a second U-phase compare register, connected to said control circuit, for storing third and fourth U-phase reference values in accordance with said counting direction signal;

a second U-phase comparator, connected to said up/down counter and said second U-phase compare register, for comparing said count value with said third and fourth reference values to generate third and fourth U-phase coincidence signals when said count value coincides with said third and fourth U-phase reference values, respectively;

a first V-phase compare register, connected to said control circuit, for storing first and second V-phase reference values in accordance with said counting direction signal;

a first V-phase comparator, connected to said up/down counter and said first V-phase compare register, for comparing said count value with said first and second V-phase reference values to generate first and second V-phase coincidence signals when said count value coincides with said first and second V-phase reference values, respectively;

a second V-phase compare register, connected to said control circuit, for storing third and fourth V-phase reference values in accordance with said counting direction signal;

a second V-phase comparator, connected to said up/down counter and said second V-phase compare register, for comparing said count value with said third and fourth reference values to generate third and fourth V-phase coincidence signals when said count value coincides with said third and fourth V-phase reference values, respectively;

a first W-phase compare register, connected to said control circuit, for storing first and second W-phase reference values in accordance with said counting direction signal;

a first W-phase comparator, connected to said up/down counter and said first W-phase compare register, for comparing said count value with said first and second W-phase reference values to generate first and second W-phase coincidence signals when said count value coincides with said first and second W-phase reference values, respectively;

a second W-phase compare register, connected to said control circuit, for storing third and fourth W-phase reference values in accordance with said counting direction signal;

a second W-phase comparator, connected to said up/down counter and said second W-phase compare register, for comparing said count value with said third and fourth reference values to generate third and fourth W-phase coincidence signals when said count value coincides with said third and fourth W-phase reference values, respectively;

a U-phase selection circuit, connected to said up/down counter and said first and second U-phase comparators, for selecting signals from said first, second, third and fourth U-phase coincidence signals in accordance with said counting direction signal;

a V-phase selection circuit, connected to said up/down counter and said first and second V-phase comparators, for selecting signals from said first, second, third and fourth V-phase coincidence signals in accordance with said counting direction signal;

a W-phase selection circuit, connected to said up/down counter and said first and second W-phase comparators, for selecting signals from said first, second, third and fourth W-phase coincidence signals in accordance with said counting direction signal;

a U-phase pulse width modulation signal generating circuit, connected to said U-phase selection circuit, for generating said complementary U- and /U-phase pulse width modulation signals in accordance with the signals selected by said U-phase selection circuit;

a V-phase pulse width modulation signal generating circuit, connected to said V-phase selection circuit, for generating said complementary V- and /V-phase pulse width modulation signals in accordance with the signals selected by said V-phase selection circuit; and a W-phase pulse width modulation signal generating circuit, connected to said W-phase selection circuit, for generating said complementary W- and /W-phase pulse width modulation signals in accordance with the signals selected by said W-phase selection circuit.

12. An apparatus for generating complementary U- and /U-phase pulse width modulation signals, complementary V- and /V-phase pulse width modulation signals and complementary W- and /W-phase pulse width modulation signals, comprising:

a control circuit;

a first up/down counter, connected to said control circuit, for counting pulses of a clock signal to generate a first count value in accordance with a counting direction signal from said control circuit;

a second up/down counter, connected to said control circuit, for counting the pulses of said clock signal to generate a second count value in accordance with said counting direction signal, said second count value including a first offset amount with respect to said first count value;

a third up/down counter, connected to said control circuit, for counting the pulses of said clock signal to generate a third count value in accordance with said counting direction signal, said third count value including a second offset amount with respect to said second count value;

a U-phase compare register, connected to said control circuit, for storing a U-phase reference value;

a first U-phase comparator, connected to said first up/down counter and said U-phase compare register, for comparing said first count value with said U-phase reference value to generate a first U-phase coincidence signal when said first count value coincides with said U-phase reference value;

a second U-phase comparator, connected to said second up/down counter and said U-phase compare register, for comparing said second count value with said U-phase reference value to generate a second U-phase coincidence signal when said second count value coincides with said U-phase reference value;

a third U-phase comparator, connected to said second up/down counter and said U-phase compare register, for comparing said third count value with said U-phase reference value to generate a third U-phase coincidence signal when said third count value coincides with said U-phase reference value;

a V-phase compare register, connected to said control circuit, for storing a V-phase reference value;

a first V-phase comparator, connected to said first up/down counter and said V-phase compare register, for comparing said first count value with said V-phase reference value to generate a first V-phase coincidence signal when said first count value coincides with said V-phase reference value;

a second V-phase comparator, connected to said second up/down counter and said V-phase compare register, for comparing said second count value with said V-phase reference value to generate a second V-phase coincidence signal when said second count value coincides with said V-phase reference value;

a third V-phase comparator, connected to said second up/down counter and said V-phase compare register, for comparing said third count value with said V-phase reference value to generate a third V-phase coincidence signal when said third count value coincides with said V-phase reference value;

a W-phase compare register, connected to said control circuit, for storing a W-phase reference value;

a first W-phase comparator, connected to said first up/down counter and said W-phase compare register, for comparing said first count value with said W-phase reference value to generate a first W-phase coincidence signal when said first count value coincides with said W-phase reference value;

a second W-phase comparator, connected to said second up/down counter and said W-phase compare register, for comparing said second count value with said W-phase reference value to generate a second W-phase coincidence signal when said second count value coincides with said W-phase reference value;

a third W-phase comparator, connected to said second up/down counter and said W-phase compare register, for comparing said third count value with said W-phase reference value to generate a third W-phase coincidence signal when said third count value coincides with said W-phase reference value;

a U-phase selection circuit, connected to said control circuit and said first, second and third U-phase comparators, for selecting signals from said first, second and third U-phase coincidence signals in accordance with said counting direction signal;

a V-phase selection circuit, connected to said control circuit and said first, second and third V-phase comparators, for selecting signals from said first, second and third V-phase coincidence signals in accordance with said counting direction signal;

a W-phase selection circuit, connected to said control circuit and said first, second and third W-phase comparators, for selecting signals from said first, second and third W-phase coincidence signals in accordance with said counting direction signal;

a U-phase pulse width modulation signal generating circuit, connected to said U-phase selection circuit, for generating said complementary U- and /U-phase pulse width modulation signals in accordance with the signals selected by said U-phase selection circuit;

a V-phase pulse width modulation signal generating circuit, connected to said V-phase selection circuit, for generating said complementary V- and /V-phase pulse width modulation signals in accordance with the signals selected by said V-phase selection circuit; and a W-phase pulse width modulation signal generating circuit, connected to said W-phase selection circuit, for generating said complementary W- and /W-phase pulse width modulation signals in accordance with the signals selected by said W-phase selection circuit.

* * * * *